United States Patent
Sugihara

(10) Patent No.: US 10,651,481 B2
(45) Date of Patent: May 12, 2020

(54) CELL STACK DEVICE, MODULE, AND MODULE-CONTAINING DEVICE

(71) Applicant: KYOCERA Corporation, Kyoto-shi, Kyoto (JP)

(72) Inventor: Kazunari Sugihara, Kirishima (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 672 days.

(21) Appl. No.: 15/126,685

(22) PCT Filed: Mar. 25, 2015

(86) PCT No.: PCT/JP2015/059166
§ 371 (c)(1),
(2) Date: Sep. 16, 2016

(87) PCT Pub. No.: WO2015/147072
PCT Pub. Date: Oct. 1, 2015

(65) Prior Publication Data
US 2017/0092963 A1    Mar. 30, 2017

(30) Foreign Application Priority Data

| Mar. 26, 2014 | (JP) | 2014-063964 |
| Nov. 28, 2014 | (JP) | 2014-241708 |
| Nov. 28, 2014 | (JP) | 2014-241711 |

(51) Int. Cl.
H01M 8/0223    (2016.01)
H01M 8/247    (2016.01)
(Continued)

(52) U.S. Cl.
CPC ............ H01M 8/0223 (2013.01); C25B 1/08 (2013.01); C25B 9/04 (2013.01); C25B 9/20 (2013.01);
(Continued)

(58) Field of Classification Search
None
See application file for complete search history.

(56) References Cited

U.S. PATENT DOCUMENTS

| 4,833,045 A | 5/1989 | Pollack et al. | |
| 2010/0331165 A1* | 12/2010 | Lee | C03C 8/14 501/32 |
| 2011/0117470 A1* | 5/2011 | Aras | H01M 8/04014 429/452 |

FOREIGN PATENT DOCUMENTS

| EP | 2393148 A1 | 12/2011 |
| JP | 2007-059377 A | 3/2007 |

(Continued)

OTHER PUBLICATIONS

The Extended European Search Report based on Application No. 15 77 0315.8 (7 pages) dated Sep. 21, 2017 (reference purpose only).
(Continued)

*Primary Examiner* — Amanda J Barrow
(74) *Attorney, Agent, or Firm* — Viering, Jentschura & Partner MBB

(57) ABSTRACT

A cell stack device (1) according to the present invention includes a plurality of cells (3) having a columnar shape; and electrically conductive members (4) interposed between adjacent cells (3) of the plurality of cells (3), and connected to the each adjacent cell (3) with a bonding material (15) having electrically conductive property. The bonding material (15) contains electrically conductive particles and fibrous bodies (16) having electrically insulating properties, and a major axis direction of the fibrous bodies (16) is oriented in a predetermined direction in regions where the electrically conductive members (4) face to the each adjacent cell (3).

14 Claims, 11 Drawing Sheets

(51) Int. Cl.
  *H01M 8/243*  (2016.01)
  *H01M 8/0217*  (2016.01)
  *H01M 8/0247*  (2016.01)
  *H01M 8/0228*  (2016.01)
  *C25B 9/04*  (2006.01)
  *C25B 9/20*  (2006.01)
  *C25B 1/08*  (2006.01)
  *H01M 8/124*  (2016.01)

(52) U.S. Cl.
  CPC ....... *H01M 8/0217* (2013.01); *H01M 8/0228* (2013.01); *H01M 8/0247* (2013.01); *H01M 8/243* (2013.01); *H01M 2008/1293* (2013.01); *Y02E 60/366* (2013.01)

(56) References Cited

FOREIGN PATENT DOCUMENTS

| | | | | |
|---|---|---|---|---|
| JP | 2010-257744 | * | 11/2010 | .............. H01M 8/02 |
| JP | 2010-257744 | A | 11/2010 | |
| JP | 2013-012399 | A | 1/2013 | |
| JP | 2013159542 | A | 8/2013 | |

OTHER PUBLICATIONS

International Search Report (Form PCT/ISA/210) dated Jun. 23, 2015 and issued for PCT/JP2015/059166.

* cited by examiner

CELL STACK DEVICE, MODULE, AND MODULE-CONTAINING DEVICE

TECHNICAL FIELD

The present invention relates to a cell stack device, a module, and a module-containing device.

BACKGROUND ART

In recent years, cell stack devices in which a plurality of solid oxide fuel cells (sometimes referred to simply as "fuel cells" hereinafter) serving as cells capable of generating electrical power using a fuel gas (hydrogen-containing gas) and an oxygen-containing gas (air) are electrically arranged have been proposed as next-generation energy sources. Meanwhile, various types of fuel cell modules in which a cell stack device is housed in a housing container, as well as various types of fuel cell devices in which such a fuel cell module is housed in an external case, have also been proposed (see Patent Document 1, for example).

In such a cell stack device, a plurality of fuel cells, each having a flat plate shaped support body with a pair of main surfaces, are electrically connected in series with electrically conductive members, and the fuel cells and electrically conductive members are connected using an electrically conductive joining material (see Patent Document 2, for example).

Furthermore, a porous collection layer containing electrically conductive particles made from a perovskite-type composite oxide and fibrous bodies made from alumina, which aims to suppress firing shrinkage so as to suppress cracking and ensure high power generation performance for extended periods, is known as a porous collection layer for electrically connecting adjacent fuel cells (see Patent Document 3, for example).

CITATION LIST

Patent Literature

Patent Document 1: Japanese Unexamined Patent Application Publication No. 2007-59377A
Patent Document 2: Japanese Unexamined Patent Application Publication No. 2013-12399A
Patent Document 3: Japanese Unexamined Patent Application Publication No. 2010-257744A

SUMMARY OF INVENTION

Technical Problem

Although the porous collection layer disclosed in Patent Document 3 is excellent in terms of being able to suppress cracking, alumina is an electrically insulating material, and there has thus been room for improvement in terms of electrical conductivity. Meanwhile, with respect to Patent Document 2, the fuel cells sometimes warp during the manufacturing process or the like. This warp may produce cracks in the electrically conductive joining material, which in turn can cause the cells and the electrically conductive member to peel away from each other.

In light of this, an object of the present invention is to provide a cell stack device having improved performance, a module, and a module-containing device.

Solution to Problem

A cell stack device according to the present invention includes a plurality of cells having a columnar shape and an electrically conductive member disposed between two of the cells that are adjacent to each other and connected to each of the two of the cells with a bonding material having electrically conductive property. The bonding material contains electrically conductive particles and fibrous bodies having electrically insulating properties, and a major axis direction of the fibrous bodies is oriented in a predetermined direction in regions where the electrically conductive member faces the two of the cells.

A module according to the present invention includes the above-described cell stack device and a housing container containing the cell stack device therein.

A module-containing device according to the present invention includes the above-described module, an auxiliary device configured to operate the module, and an external case containing the module and the auxiliary device therein.

Advantageous Effects of Invention

A cell stack device according to the present invention can provide an electrolytic cell stack device having improved performance.

Additionally, a module according to the present invention can provide a module having improved performance.

Furthermore, a module-containing device according to the present invention can provide a module-containing device having improved performance.

BRIEF DESCRIPTION OF DRAWINGS

FIG. 1A is a side view schematically illustrating the cell stack device and FIG. 1B is a horizontal cross-sectional view illustrating part of FIG. 1A in an enlarged manner.

FIG. 2A is a perspective view and FIG. 2B is a cross-sectional view taken from a B-B line.

FIG. 4A is a photograph corresponding to a cross-section obtained by cutting along an arrangement direction of the fuel cells and FIG. 4B is a photograph corresponding to a cross-section obtained by cutting parallel to the fuel cells.

DESCRIPTION OF EMBODIMENTS

Figure 1A:
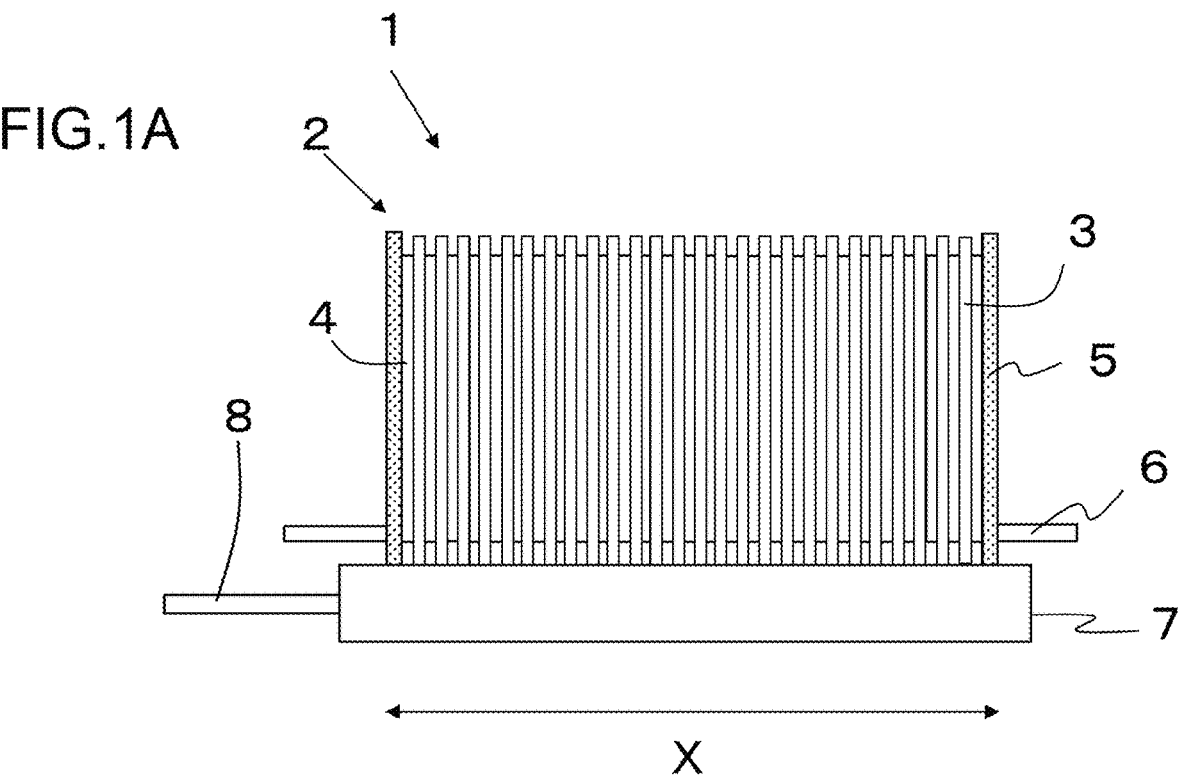
FIGS. 1A and 1B illustrate a cell stack device according to an embodiment, where
Figure 1B:
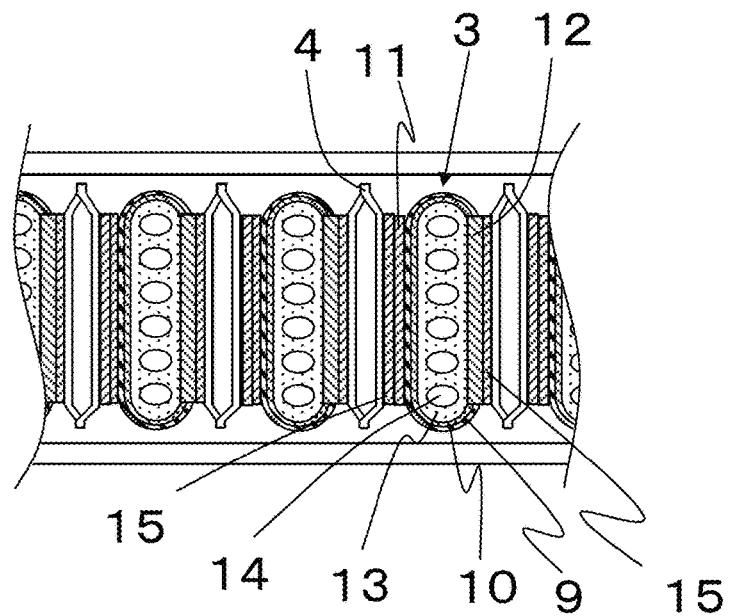

A cell stack device according to the present embodiment will be described hereinafter using the drawings. FIGS. 1A and 1B illustrate the cell stack device according to the present embodiment, where FIG. 1A is a side view schematically illustrating the cell stack device and FIG. 1B is a side cross-sectional view illustrating part of FIG. 1A in an enlarged manner. Note that in the subsequent drawings, identical constituent elements are indicated using the same reference numerals.

Note that the cell stack device illustrated in FIGS. 1A and 1B is a fuel cell stack device in which a plurality of fuel cells, which are a type of cell, are arranged. Note that in the following descriptions, a fuel cell is described as an example of the cell, and will sometimes be referred to simply as a "cell".

A cell stack device 1 illustrated in FIGS. 1A and 1B includes a cell stack 2 including a plurality of columnar fuel cells 3. Each fuel cell 3 includes gas-flow passages 14 in its interior, and is formed by laminating a fuel electrode layer 9, which is an inner electrode layer, a solid electrolyte layer 10, and an air electrode layer 11, which is an outer electrode layer, in that order on one flat face of a support body 13 that has a flat cross-section having a pair of opposing flat faces, and laminating an interconnector 12 to a part of the other flat face where the fuel electrode layer 9 is not formed.

The fuel cells 3 are electrically connected to each other in series by interposing electrically conductive members 4 between adjacent fuel cells 3. Note that an electrically conductive bonding material 15, which will be described later, is disposed on an outer surface of the interconnector 12 and an outer surface of the air electrode layer 11. By connecting the electrically conductive member 4 to the air electrode layer 11 and the interconnector 12 using the bonding material 15, the contact between those elements becomes ohmic contact, reducing a drop in potential and effectively suppressing a drop in electrical conductivity performance.

A lower end of each fuel cell 3 that constitutes the cell stack 2 is fixed, using a bonding material such as a glass sealing material, to a manifold 7 for allowing a reactive gas to be supplied to the fuel cell 3 via the gas-flow passages 14. The cell stack device 1 illustrated in FIGS. 1A and 1B is illustrated as an example in which the manifold 7 allows hydrogen-containing gas (a fuel gas) to be supplied to the gas-flow passages 14 as the reactive gas, and a fuel gas supply pipe 8 for allowing the fuel gas to be supplied to the manifold 7 is connected to a side surface of the manifold 7.

Additionally, an elastically deformable electrically conductive member 5 whose lower end is fixed to the manifold 7 is provided sandwiching the cell stack 2, via the electrically conductive members 4, from both ends in an arrangement direction (the X direction in FIG. 1A) of the fuel cells 3. Here, in the electrically conductive member 5 illustrated in FIG. 1A, a current extracting member 6 is provided for leading out electrical current generated by the power generation of the cell stack 2 (the fuel cells 3) with a shape extending outward in the arrangement direction of the fuel cells 3.

Incidentally, the above-described cell stack device 1 can have a configuration in which fuel gas exhausted from the gas-flow passages 14 (excess fuel gas) is burned on an upper end portion side of the fuel cells 3 and raise the temperature of the fuel cells 3. This configuration makes it possible to accelerate the startup of the cell stack device 1.

Each member constituting the fuel cell 3 illustrated in FIGS. 1A and 1B will be described next.

A well-known conventional material can be used for the fuel electrode layer 9. For example, the fuel electrode layer 9 can be formed of $ZrO_2$ (referred to as a stabilized zirconia that also includes partially stabilized zirconia) containing a porous electrically conductive ceramic such as a rare earth element oxide in solid solution and Ni and/or NiO.

The solid electrolyte layer 10 must function as an electrolyte that allows electrons to move between the electrodes and have a gas blocking property that prevents fuel gas and oxygen-containing gas leaks. The solid electrolyte layer 10 is formed of $ZrO_2$ containing from 3 to 15 mol % of a rare earth element oxide in solid solution. Note that the solid electrolyte layer 10 may be formed of another material as long as that material exhibits the abovementioned properties.

The material for the air electrode layer 11 is not particularly limited, and any well-known conventional material may be used. For example, the air electrode layer 11 may be formed of an electrically conductive ceramic made from a so-called $ABO_3$ perovskite oxide. The air electrode layer 11 must be gas-permeable, and the open porosity of the air electrode layer 11 is preferably no less than 20% and particularly in the range of 30 to 50%.

The interconnector 12 can be formed from electrically conductive ceramics, but because the interconnector 12 makes contact with the fuel gas (hydrogen-containing gas) and oxygen-containing gas (air or the like), the interconnector 12 must be reduction resistant and oxidation resistant. As such, a lanthanum chromite perovskite oxide ($LaCrO_3$ oxide) is suitable for use as the interconnector 12. The interconnector 12 must be dense in order to prevent leaks of the fuel gas flowing through the plurality of gas-flow passages 14 formed in the support body 13 as well as leaks of the oxygen-containing gas flowing outside the support body 13. Thus, the interconnector 12 preferably has a relative density of no less than 93% and particularly no less than 95%.

The support body 13 must be gas permeable to allow the fuel gas to permeate through to the fuel electrode layer 9 and must also be electrically conductive in order to allow current collection via the interconnector 12. Therefore, it is necessary to employ a material that satisfies these requirements, and as such, a material such as an electrically conductive ceramic or cermet can be used for the support body 13. For production of the fuel cells 3, if the support body 13 is produced by simultaneous sintering with the fuel electrode layer 9 or the solid electrolyte layer 10, the support body 13 is preferably formed of an iron group metal component and a specific rare earth oxide ($Y_2O_3$, $Yb_2O_3$, or the like). Additionally, to ensure a desired gas permeability, the support body 13 preferably has an open porosity of no less than 30% and particularly in the range of 35 to 50%. The support body 13 also preferably has an electrical conductivity of no less than 300 S/cm and particularly no less than 440 S/cm.

Although not illustrated in the drawings, an intermediate layer may be formed between the solid electrolyte layer 10 and the air electrode layer 11 with the aim of strengthening the bond between the solid electrolyte layer 10 and the air electrode layer 11 and suppressing the formation of a reactive layer with high electric resistance due to a reaction between the components of the solid electrolyte layer 10 and the components of the air electrode layer 11.

The intermediate layer can be formed by a composition that contains Cerium (Ce) and another rare earth element. The intermediate layer preferably has a composition expressed by, for example,

$$(CeO_2)_{1-x}(REO_{1.5})_x, \quad (1):$$

where RE represents at least one of Sm, Y, Yb, and Gd, and $x$ represents a number satisfying $0 < x \le 0.3$. Furthermore, to reduce electric resistance, Sm or Gd is preferably used as RE. For example, the intermediate layer preferably contains a $CeO_2$ solid solution containing from 10 to 20 mol % of $SmO_{1.5}$ or $GdO_{1.5}$.

Additionally, the intermediate layer can be formed of two layers in order to strongly bond the solid electrolyte layer 10 with the air electrode layer 11 and further suppress the formation of a reaction layer having a high electric resistance due to a reaction between components of the solid electrolyte layer 10 and components of the air electrode layer 11.

Additionally, although not illustrated, a cohesion layer for reducing, for example, a difference in thermal expansion coefficients between the interconnector 12 and the support body 13 may also be disposed between the interconnector 12 and the support body 13.

A composition similar to that of the fuel electrode layer 9 can be used as the cohesion layer. For example, the cohesion layer can be formed of $ZrO_2$ containing a rare earth element oxide such as $Y_2O_3$ in solid solution and Ni and/or NiO. Note that the $ZrO_2$ containing the rare earth element oxide in a solid solution and the Ni and/or NiO are preferably set to a volume ratio in a range of 40:60 to 60:40.

Figure 2A:
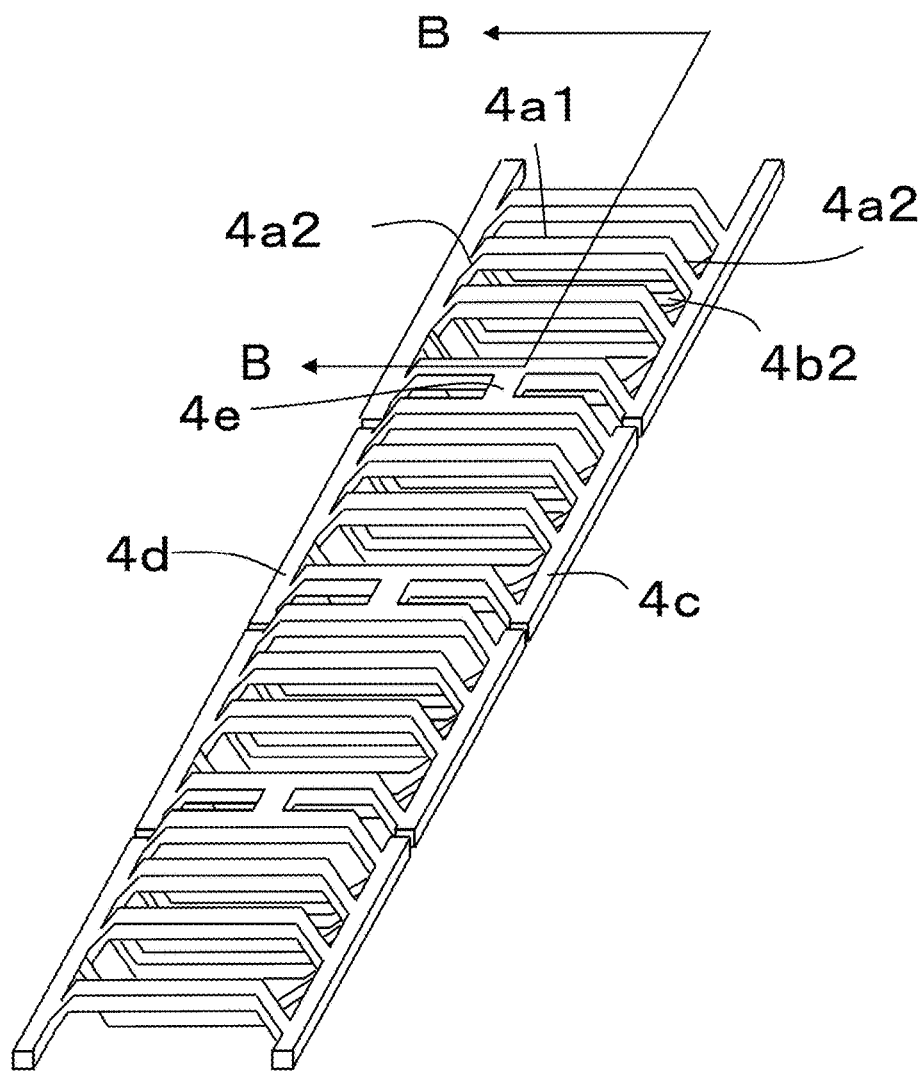
FIGS. 2A and 2B illustrate an electrically conductive member illustrated in FIGS. 1A and 1B in an excerpted manner, where
Figure 2B:
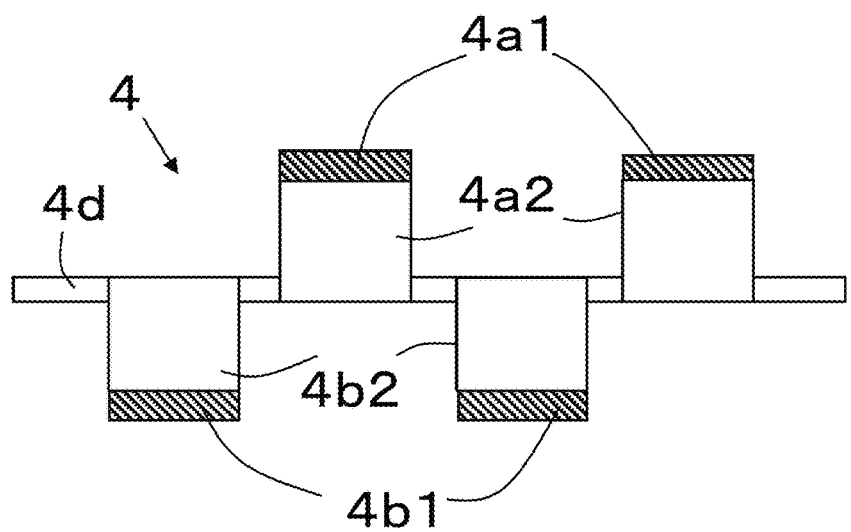
Figure 3:
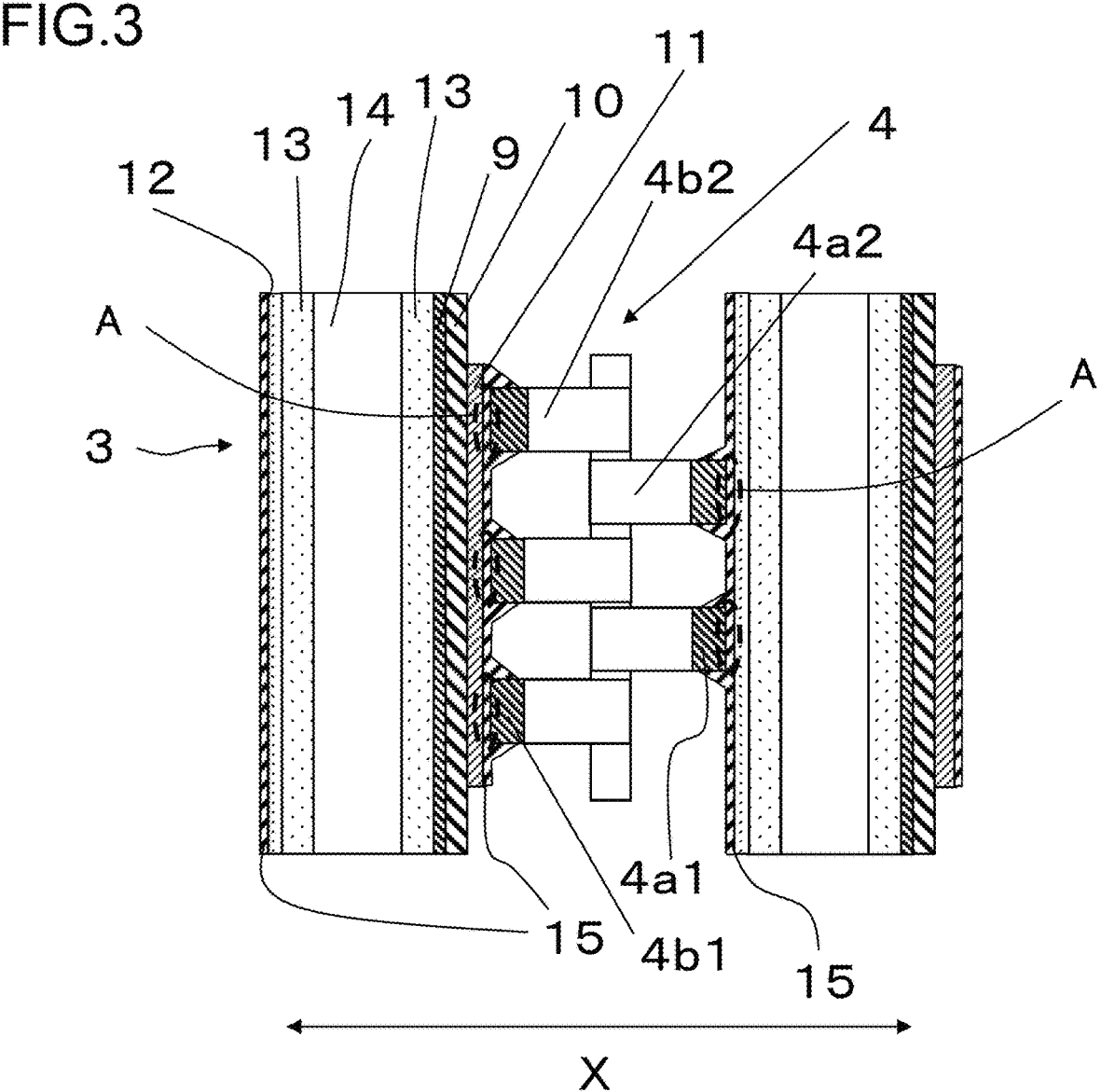
FIG. 3 illustrates a pair of cells bonded by a bonding material via an electrically conductive member, and is a vertical cross-sectional view illustrating a state of bonding between first and second cell opposing face parts of the electrically conductive member and fuel cells.

FIGS. 2A and 2B illustrate the electrically conductive member 4 illustrated in FIGS. 1A and 1B in an excerpted manner, where FIG. 2A is a perspective view and FIG. 2B is a cross-sectional view taken from a B-B line. FIG. 3 illustrates a pair of fuel cells bonded by the bonding material via the electrically conductive member, and is a vertical cross-sectional view illustrating a state of bonding between first and second cell opposing face parts of the electrically conductive member and the fuel cells.

The electrically conductive member 4 illustrated in FIGS. 2A and 2B include: a plurality of plate-shaped first cell opposing face parts 4a1 bonded to one adjacent fuel cell 3; plate-shaped first spacing parts 4a2 extending from both sides of each first cell opposing face part 4a1 away from the fuel cells; a plurality of plate-shaped second cell opposing face parts 4b1 bonded to another adjacent fuel cell 3; and plate-shaped second spacing parts 4b2 extending from both sides of each second cell opposing face part 4b1 away from the fuel cells.

Furthermore, a first linking part 4c linking the ends at one side of the plurality of first spacing parts 4a2 and the plurality of second spacing parts 4b2, and a second linking part 4d linking the other ends of the plurality of first spacing parts 4a2 and the plurality of second spacing parts 4b2, are set as one unit, and a plurality of these units are configured to be linked using electrically conductive linking pieces 4e in a longitudinal direction of the fuel cells 3. As illustrated in FIG. 3, the first cell opposing face parts 4a1 and the second cell opposing face parts 4b1 are parts that are bonded to the fuel cells 3 by the bonding material 15.

As such, the first cell opposing face parts 4a1 oppose the interconnector 12 provided in the plurality of fuel cells 3, and the second cell opposing face parts 4b1 oppose the air electrode layer 11. The interconnector 12 is formed extending beyond both sides of the first cell opposing face parts 4a1, and the air electrode layer 11 is formed extending beyond both sides of the second cell opposing face parts 4b1.

To ensure current resulting from power generation in power generation parts of the fuel cells 3 flows efficiently, the length of the electrically conductive member 4 in the longitudinal direction of the fuel cells 3 is preferably no less than the length of the air electrode layer 11 in the longitudinal direction of the fuel cells 3.

Here, the electrically conductive member 4 must be thermally resistant and electrical conductive, and can therefore be produced from a metal or an alloy. Particularly, because the electrically conductive member 4 is exposed to a high-temperature oxidizing atmosphere, the electrically conductive member 4 can be produced from an alloy containing Cr at a percentage of 4 to 30%, and can be produced from a Fe—Cr alloy, a Ni—Cr alloy, or the like.

Additionally, because the electrically conductive member 4 is exposed to a high-temperature oxidizing atmosphere while the cell stack device 1 is operating, the surface of the electrically conductive member 4 may be given an oxidation resistant coating. This coating makes it possible to reduce deterioration of the electrically conductive member 4. Preferably, the oxidation resistant coating is provided on the entire surface of the electrically conductive member 4. This coating makes it possible to suppress exposure of the surface of the electrically conductive member 4 to the high-temperature oxidizing atmosphere.

The electrically conductive member 4 illustrated in FIGS. 2A and 2B can be produced by press-machining a single rectangular sheet member to form a plurality of slits, each extending in a width direction of the sheet member, in a longitudinal direction of the sheet member, so that the parts between the slits, which are the first cell opposing face parts 4a1, the first cell spacing parts 4a2, the second cell opposing face parts 4b1, and the second cell spacing parts 4b2, protrude in an alternating manner.

The bonding material 15 according to a first embodiment, for connecting the electrically conductive member 4 to the air electrode layer 11 and the interconnector 12 of the fuel cell 3, will be described next.

The bonding material 15 according to the present embodiment contains electrically conductive particles and electrically insulating fibrous bodies. Particles made from a perovskite transition metal oxide can be given as an example of the electrically conductive particles. Specifically, a material that has a higher electron conductivity than that of the material forming the interconnector, such as a p-type semiconductor ceramic made from at least one of an LaSrCoFeO$_3$ oxide, an LaMnO$_3$ oxide, an LaFeO$_3$ oxide, and an LaCoO$_3$ oxide having Mn, Fe, Co, or the like at the B site may be used, for example.

Incidentally, in the case where the bonding material is formed of particles made from a perovskite transition metal oxide as described above, cracks may be formed in the bonding material. As such, the bonding material 15 according to the present embodiment contains the electrically insulating fibrous bodies with the aim of suppressing the formation of such cracks.

There are cases where the electrically conductive particles are sintered together during manufacture, power generation, or the like, which produces firing shrinkage. However, providing the electrically insulating fibrous bodies suppresses firing shrinkage caused by the electrically conductive particles being sintered together, which makes it possible to suppress the formation of cracks. To better suppress the formation of cracks, the electrically insulating fibrous bodies preferably have a lower thermal expansion coefficient than that of the electrically conductive particles. For example, at least one oxide of Al, Ti, and Si can be used.

From the standpoint of suppressing firing shrinkage between the electrically conductive particles and suppressing the formation of cracks, a material having an average diameter (this corresponds to a major axis, which will be mentioned later) of no less than 3 μm, and preferably from 5 to 15 μm, and an average aspect ratio (major axis/minor axis) of no less than 3, and preferably from 5 to 15, can be used for the fibrous bodies. The average diameter and the average aspect ratio of the fibrous bodies can be found by dissolving and removing the perovskite transition metal oxide contained in the bonding material 15 using hydrochloric acid or the like, using a scanning electron microscope (SEM) to find the diameters and aspect ratios of, for example, 100 pieces of the fibrous bodies that remain, and then finding the average of those diameters and aspect ratios.

The bonding material 15 preferably contains from 70 to 95 mass % of the electrically conductive particles and from 5 to 30 mass % of the fibrous bodies.

However, because the above-described fibrous bodies are electrically insulating, there have been cases where the bonding material 15 itself is less electrically conductive. As such, according the present embodiment, using the configuration of the cell stack device 1 illustrated in FIG. 3 as an example, the fibrous bodies contained in the bonding material 15 are oriented with a major axis direction thereof being a direction perpendicular to the fuel cells 3 in parts where the electrically conductive member 4 and the fuel cells 3 oppose each other (parts indicated by broken lines A in FIG. 3). This "direction perpendicular to the fuel cells 3" corresponds to a "predetermined direction".

In the cell stack device 1 illustrated in FIG. 3, an electrical current resulting from the power generation of the fuel cells 3 flows in the left and right directions in FIG. 3. In this case, the electrical current resulting from the power generation of the fuel cells 3 flows with avoiding the surfaces of the fibrous bodies. However, orienting the fibrous bodies with a major axis direction thereof being a direction perpendicular to the fuel cells 3 as in the present embodiment makes it possible to shorten an electrical current path between the fuel cells 3 and increase the electrical conductivity.

Figure 4A:
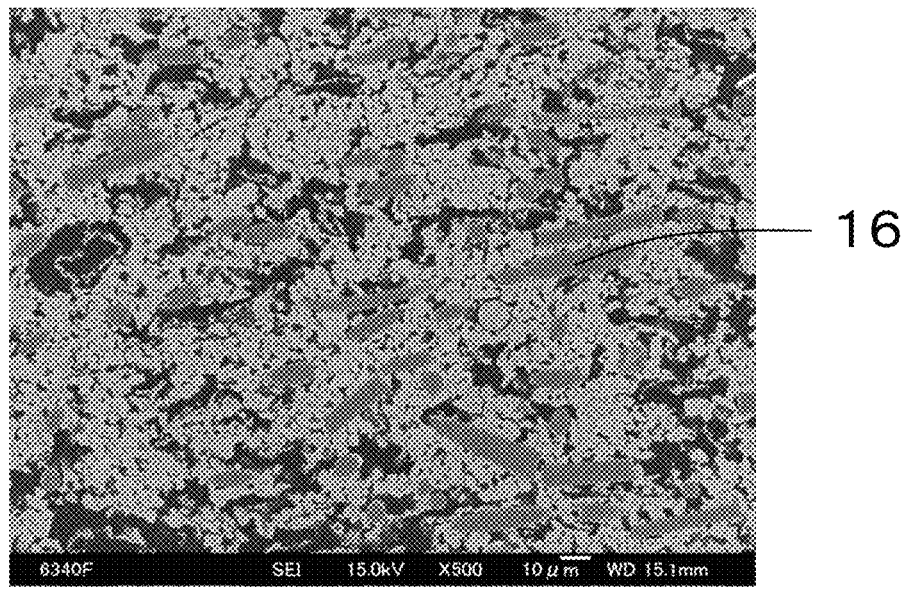
FIGS. 4A and 4B are scanning electron microscope (SEM) photographs of a member schematically prepared of a bonding material according to a first embodiment, corresponding to broken line areas indicated in FIG. 3, where
Figure 4B:
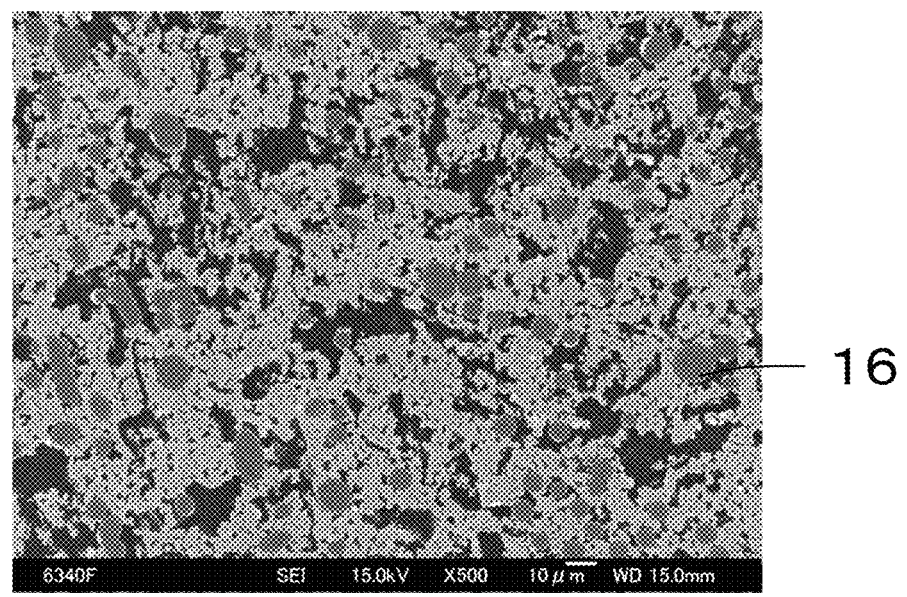

FIGS. 4A and 4B are scanning electron microscope (SEM) photographs of the schematically-prepared bonding material, corresponding to the broken line areas in FIG. 3 indicating the bonding material 15 that bonds the fuel cells 3 to the electrically conductive member 4, where FIG. 4A is a photograph corresponding to a cross-section obtained by cutting in the arrangement direction (the X direction in FIG. 3) of the fuel cells 3 (in other words, a cross-section perpendicular to a lateral direction of the fuel cells) and FIG. 4B is a photograph corresponding to a cross-section obtained by cutting parallel to the fuel cells 3 (in other words, a cross-section perpendicular to a thickness direction of the bonding material).

In FIGS. 4A and 4B, areas indicated by dark gray represent fibrous bodies 16, and in FIG. 4A, the fibrous bodies 16 are oriented in the left and right directions, which are directions perpendicular to the fuel cells 3. This orientation of the fibrous bodies 16 makes it possible to reduces instances of the flow of electrical current between the fuel cells 3 and the electrically conductive members 4 being inhibited, which in turn improves the electrical conductivity.

Note that in the present embodiment, the fibrous bodies 16 being oriented in a direction perpendicular to the fuel cells 3 means that an angle at which an extended line of the major axis direction of the fibrous bodies 16 intersects with the fuel cells 3 in a cross-section perpendicular to the lateral direction of the fuel cells 3 is in a range of 45 to 135 degrees, and the same applies hereinafter.

Here, to improve the electrical conductivity between the fuel cells 3 and the electrically conductive members 4, 50% or greater of the fibrous bodies 16 in the bonding material 15 is preferably oriented in a direction perpendicular to the fuel cells 3, and further 90% or greater of the fibrous bodies 16 is preferably oriented in a direction perpendicular to the fuel cells 3 in a cross-section perpendicular to the lateral direction of the fuel cells 3. This ensures that the electrical current flows efficiently between the fuel cells 3 and the electrically conductive members 4, which makes it possible to improve the electrical conductivity.

To find the aforementioned percentage of the fibrous bodies 16 oriented in a direction perpendicular to the fuel cells 3, first, 10 fibrous bodies whose aspect ratios (major axis/minor axis) are no higher than 1.5 are selected at random in a photograph corresponding to a cross-section obtained by cutting parallel to the fuel cells 3, such as that indicated in FIG. 4B, and an average length of those major axes is then found. Meanwhile, the length of each major axis is found in a photograph corresponding to a cross-section perpendicular to the lateral direction of the fuel cells 3, such as that indicated in FIG. 4A. In the case where the length of the major axis is shorter than the average length of the major axis found from FIG. 4B, the fibrous bodies 16 are determined not to be oriented in a direction perpendicular to the fuel cells 3. On the other hand, when the length of the major axis calculated on the basis of FIG. 4A is longer than the average length of the major axis found in FIG. 4B, an angle at which an extended line of that major axis intersects with an end of the photograph (this refers to a left end or a right end of the photograph, and corresponds to a surface of the fuel cell) is calculated, and when that angle is from 45 to 135 degrees, the fibrous bodies 16 according to the present embodiment are determined to be oriented in a direction perpendicular to the fuel cells 3. The percentage of the fibrous bodies 16 oriented in a direction perpendicular to the fuel cells 3 can then be found by dividing the number of the fibrous bodies 16 in the cross-sectional photograph indicated in FIG. 4A counted as being oriented in a direction perpendicular to the fuel cells 3 by the total number of fibrous bodies 16 in the cross-sectional photograph.

Furthermore, because the electrical current resulting from the power generation of the fuel cells 3 flows with avoiding the surfaces of the fibrous bodies 16, the distance the current flows to avoid these surfaces is preferably short. As such, in the photograph corresponding to the cross-section obtained by cutting parallel to the fuel cells 3 (the cross-section perpendicular to the thickness direction of the bonding material 15), indicated in FIG. 4B, the ratio of the major axes relative to the minor axes of the fibrous bodies 16 is preferably no higher than 1.7. Doing so brings the shape of the fibrous bodies 16 closer to a square column or a circular column, which makes it possible to shorten the distance in which the electrical current takes to avoid the surfaces in the major axis direction of the cross-section of the fibrous bodies 16, and makes it possible to improve the electrical conductivity. To find the ratio of the major axes to the minor axes, for example, a random 50 μm by 50 μm square region may be set in the photograph corresponding to the cross-section obtained by cutting parallel to the fuel cells 3 (the cross-section perpendicular to the thickness direction of the bonding material 15) indicated in FIG. 4B; the ratio of the major axis to the minor axis may be found for all the fibrous bodies 16 present in that region, and an average value thereof may be calculated.

Incidentally, the above-described bonding material 15 is produced by using a barrel mill, a tumbling mill, a vibrating mill, a bead mill, a sand mill, an agitator mill, or the like to wet mix and grind a powder of the electrically conductive particles and the fibrous bodies with an organic binder such as paraffin wax, polyvinyl alcohol (PVA), or polyethylene glycol (PEG) to produce a slurry.

The bonding material according to the present embodiment can be completed by laying the fuel cells 3 or the electrically conductive members 4 flat and using a dispenser in which a plurality of ejection holes are formed to apply the slurry to the surfaces thereof, or producing a sheet in which the fibrous bodies 16 are oriented in the thickness direction of the sheet, laminating the sheet to the surfaces thereof, and then subjecting the sheet to a thermal treatment.

Figure 5:
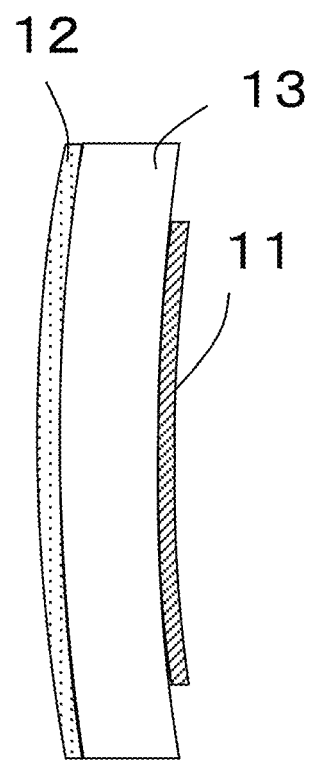
FIG. 5 is a schematic diagram of a cell side surface, illustrating warping in a cell.

A bonding material 15 according to a second embodiment will be described next. FIG. 5 is a schematic diagram of a cell side surface, illustrating warping in a fuel cell.

In the above-described fuel cell 3, the air electrode layer 11 is disposed on one main surface side of the support body 13 and the interconnector 12 is disposed on the other main surface side. Therefore, when, for example, a hydrogen-containing gas (fuel gas) is supplied to the gas-flow passages 14 in the support body 13, a reduction expansion amount of the interconnector 12 increases, and the support body 13 tends to warp, with one main surface thereof bending inward and the other main surface bending outward as illustrated in FIG. 5. As a result, the interconnector 12 and the air electrode layer 11 also tend to deform as the support body 13 warps, as illustrated in FIG. 5. This has made it possible for cracks to form in the bonding material 15 between the electrically conductive member 4 and the air electrode layer 11. Similarly, there has been a risk of cracks forming in the bonding material 15 between the electrically conductive members 4 and the interconnector 12, causing the fuel cell 3 and the electrically conductive member 4 to peel away from each other.

As such, according to the present embodiment, the major axis direction of the fibrous bodies 16 is oriented in the longitudinal direction of the fuel cells 3 in the bonding material 15 that connects the fuel cells 3 and the electrically conductive member 4. This "longitudinal direction of the fuel cells 3" corresponds to a "predetermined direction". In this case, the orientation direction of the fibrous bodies 16 in the bonding material 15 on the air electrode layer 11 side is substantially the same orientation as the direction of compression arising on the air electrode layer 11 side. This makes it difficult for the fibrous bodies 16 to deform under compressive stress, which makes it possible to suppress deformation in the support body 13 on the air electrode layer 11 side thereof. Suppressing deformation on the air electrode layer 11 side has the accompanying effect of suppressing deformation on the interconnector 12 side as well. This makes it possible to suppress the formation of cracks in the bonding material 15 between the electrically conductive member 4 and the air electrode layer 11 or in the bonding material 15 between the electrically conductive member 4 and the interconnector 12. Accordingly, the formation of cracks in the bonding material 15 can be suppressed.

Figure 6:
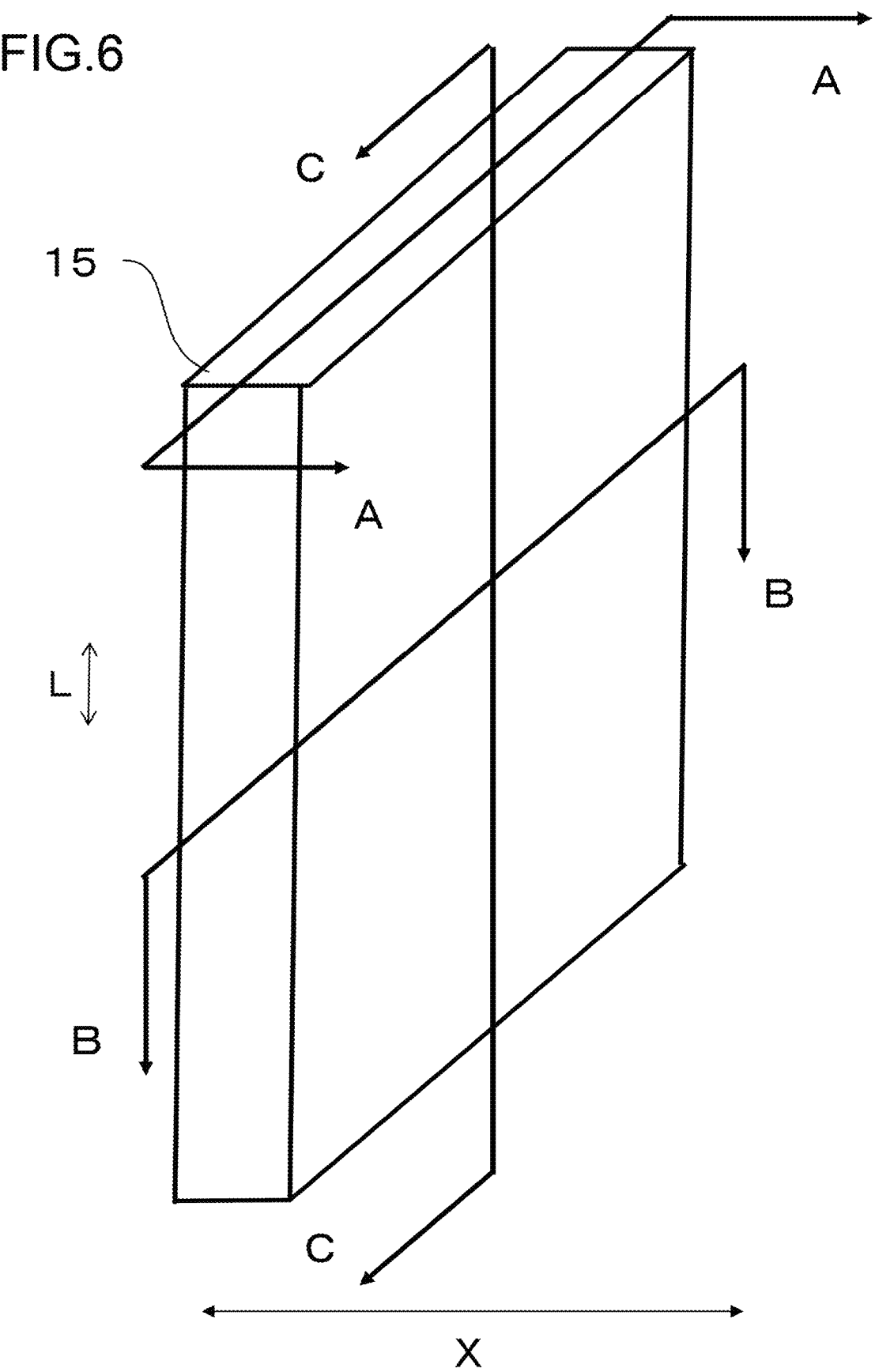
FIG. 6 is a schematic diagram illustrating cross-sections of the bonding material illustrated in FIG. 3.

FIG. 6 is a schematic diagram illustrating cross-sections of the bonding material illustrated in FIG. 3. The cross-section indicated by the A-A line is a cross-section obtained by cutting parallel to the fuel cells 3 (in other words, a cross-section perpendicular to the thickness direction of the bonding material). The cross-section indicated by the B-B line is a cross-section obtained by cutting along the arrangement direction of the fuel cells 3 (the X direction indicated in FIG. 6) (in other words, a cross-section perpendicular to the longitudinal direction of the fuel cells). The cross-section indicated by the C-C line is a cross-section obtained by cutting along the arrangement direction of the fuel cells 3 (the X direction indicated in FIG. 6) (in other words, a cross-section perpendicular to the lateral direction of the fuel cells).

Figure 7:
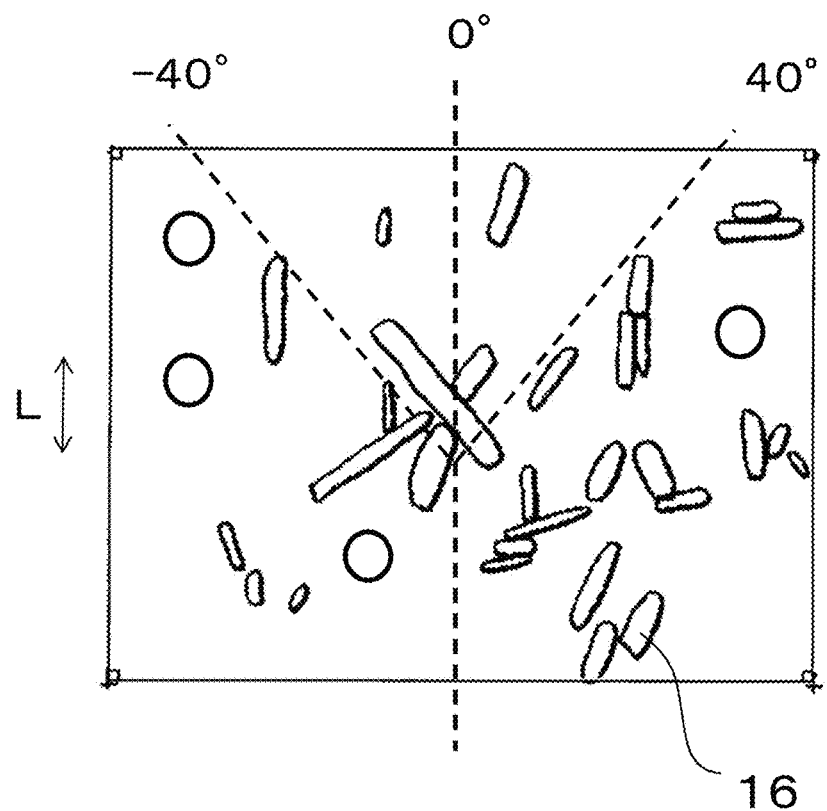
FIG. 7 is a diagram schematically illustrating a cross-section of a bonding material according to a second embodiment taken from an A-A line.

FIG. 7 is a diagram schematically illustrating a cross-section of the bonding material according to the second embodiment, taken from the A-A line.

In FIG. 7, the major axis direction of the fibrous bodies 16 is oriented in the longitudinal direction of the fuel cells 3. This orientation of the fibrous bodies 16 makes it possible to suppress the formation of cracks in the bonding material 15, as described above.

Note that in the present embodiment, the major axis direction of the fibrous bodies 16 being oriented in the longitudinal direction of the fuel cells 3 means that in a cross-section perpendicular to the thickness direction of the bonding material 15 (the cross-section indicated by the A-A line), an angle at which an extended line of the major axis direction of the fibrous bodies 16 intersects with the longitudinal direction of the fuel cells 3 is in a range of −40 to 40 degrees, and the same applies hereinafter.

Additionally, the percentage of fibrous bodies 16 whose major axis directions are oriented in the longitudinal direction of the fuel cells 3 is preferably no less than 50% in a cross-section perpendicular to the thickness direction of the bonding material 15 (the cross-section indicated by the A-A line). This makes it possible to further suppress compressive deformation on the air electrode layer 11 side, which in turn makes it possible to suppress tensile deformation on the interconnector 12 side as well. Accordingly, the formation of cracks can be further suppressed in the bonding material 15 between the electrically conductive member 4 and the air electrode layer 11 or in the bonding material 15 between the electrically conductive member 4 and the interconnector 12.

To find the aforementioned percentage of the fibrous bodies 16 whose major axis directions are oriented in the longitudinal direction of the fuel cells 3, first, 10 fibrous bodies whose aspect ratios (major axis/minor axis) are no higher than 1.5 are selected at random in the cross-section indicated by the B-B line, and an average length of those major axes is then found. Meanwhile, the length of each major axis is found in the cross-section indicated by the A-A line, such as that indicated in FIG. 7. In the case where the length of the major axis is shorter than the average length of the major axis found in the cross-section indicated by the B-B line, the major axis direction of that fibrous body 16 is determined not to be oriented in the longitudinal direction of the fuel cells 3. On the other hand, when the length of the major axis calculated on the basis of FIG. 7 is longer than the average length of the major axis found in the cross-section indicated by the B-B line, an angle at which an extended line of that major axis intersects with the longitudinal direction of the fuel cells 3 is calculated, and when that angle is from −40 to 40 degrees, the major axis directions of the fibrous bodies 16 according to the present embodiment are determined to be oriented in the longitudinal direction of the fuel cells 3. The percentage of the fibrous bodies 16 whose major axis directions are oriented in the longitudinal direction of the fuel cells 3 can then be found by dividing the number of the fibrous bodies 16 in the cross-section illustrated in FIG. 7 counted as having major axis directions oriented in the longitudinal direction of the fuel cells 3 by the total number of fibrous bodies 16 in FIG. 7.

In this measurement, the aforementioned percentage may be found by, for example, setting a random 50 µm by 50 µm square region in the cross-section perpendicular to the thickness direction of the bonding material 15 (the cross-section indicated by the A-A line).

Figure 8:
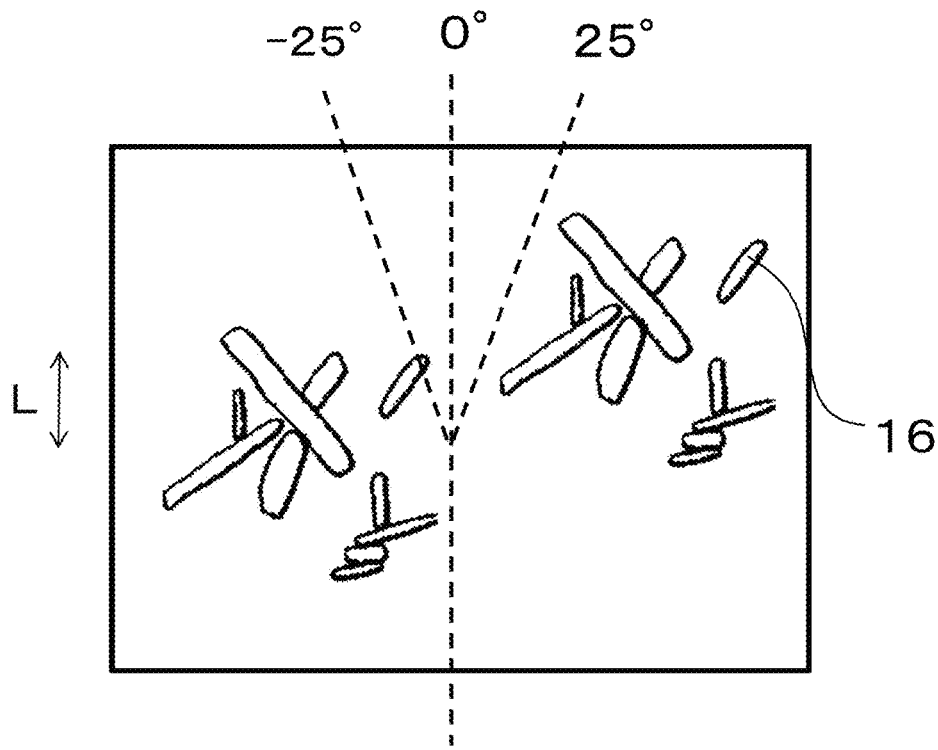
FIG. 8 is a diagram schematically illustrating a cross-section of the bonding material according to the second embodiment taken from a C-C line.

FIG. 8 is a diagram schematically illustrating a cross-section of the bonding material according to the second embodiment, taken from the C-C line.

The cell stack device 1 is in a high-temperature environment during use. As such, a difference in thermal expansion between the air electrode layer 11 and the electrically conductive member 4 at the bonding surface therebetween produces shearing stress in a direction parallel to the bonding surface. Here, if the fibrous bodies 16 in the bonding material 15 between these members is excessively oriented in a specific direction, the shearing stress will become excessively strong in the specific direction, making it easy for cracks to form in the bonding material 15 between the electrically conductive member 4 and the air electrode layer 11. Similarly, it becomes easy for cracks to form in the bonding material 15 between the interconnector 12 and the electrically conductive member 4.

As such, the percentage of fibrous bodies 16 whose major axis directions are oriented in the longitudinal direction of the fuel cells 3 is preferably no greater than 30% in a cross-section of the bonding material 15 perpendicular to the lateral direction of the fuel cells 3 (the cross-section indicated by the C-C line), as in the example illustrated in FIG. 8. Here, when the length of the major axis calculated on the basis of FIG. 8 is longer than the average length of the major axis found in the cross-section indicated by the B-B line, an angle at which an extended line of that major axis intersects with the longitudinal direction of the fuel cells 3 is calculated, and when that angle is from −25 to 25 degrees, the major axis directions of the fibrous bodies 16 according to the present embodiment are determined to be oriented in the longitudinal direction of the fuel cells 3. According to this configuration, the fibrous bodies 16 are arranged with the major axes thereof extending randomly, rather than the fibrous bodies 16 being oriented in a specific direction. This random arrangement makes it possible to distribute shearing stress produced by the difference in thermal expansions in a plurality of directions at the bonding surface between the air electrode layer 11 and the electrically conductive member 4 and at the bonding surface between the interconnector 12 and the electrically conductive member 4. This random arrangement makes it possible to reduce the shearing stress. Accordingly, the formation of cracks can be further suppressed in the bonding material 15 between the electrically conductive member 4 and the air electrode layer 11 or in the bonding material 15 between the electrically conductive member 4 and the interconnector 12.

Incidentally, the above-described bonding material 15 is produced by using a barrel mill, a tumbling mill, a vibrating mill, a bead mill, a sand mill, an agitator mill, or the like to wet mix and grind a powder of the electrically conductive particles and the fibrous bodies with an organic binder such as paraffin wax, polyvinyl alcohol (PVA), or polyethylene glycol (PEG) to produce a slurry.

The fuel cells 3 or the electrically conductive members 4 are laid flat and a dispenser in which a plurality of ejection holes are formed is used to apply the slurry to the surfaces thereof. At this time, the slurry is ejected while moving the dispenser in the longitudinal direction of the fuel cells 3. In this process, the major axis directions of the fibrous bodies 16 are oriented in the longitudinal direction of the fuel cells 3.

Meanwhile, the orientation percentage is determined by adjusting a movement speed of the dispenser, an angle of the dispenser, and a diameter of the ejection holes of the dispenser as appropriate.

In addition to this method, the bonding material according to the present embodiment can be obtained by producing a sheet in which the fibrous bodies 16 are oriented in a desired direction, laminating the sheet, and then subjecting the sheet to a thermal treatment.

A bonding material 15 according to a third embodiment will be described next.

According to the present embodiment, the major axis direction of the fibrous bodies 16 is oriented in the lateral direction of the fuel cells 3 in the bonding material 15 that connects the fuel cells 3 and the electrically conductive member 4. In this case, the orientation direction of the fibrous bodies 16 in the bonding material 15 on the interconnector 12 side is substantially the same orientation as the direction of compressive deformation arising on the interconnector 12 side (the lateral direction of the fuel cells 3). This makes it difficult for the fibrous bodies 16 to deform under compressive stress, which makes it possible to suppress deformation in the lateral direction of the fuel cells 3 on the interconnector 12 side. This in turn makes it possible to suppress tensile deformation in the interconnector 12, in the longitudinal direction of the fuel cells 3. Accordingly, the formation of cracks in the bonding material 15 between the electrically conductive member 4 and the interconnector 12 can be suppressed. Additionally, reducing deformation in the longitudinal direction of the fuel cells 3 on the interconnector 12 side makes it possible to suppress compressive deformation in the longitudinal direction of the fuel cells 3 on the air electrode layer 11 side. As such, the formation of cracks in the bonding material 15 between the electrically conductive member 4 and the air electrode layer 11 can be suppressed. Accordingly, the formation of cracks in the bonding material 15 can be suppressed.

Figure 9:
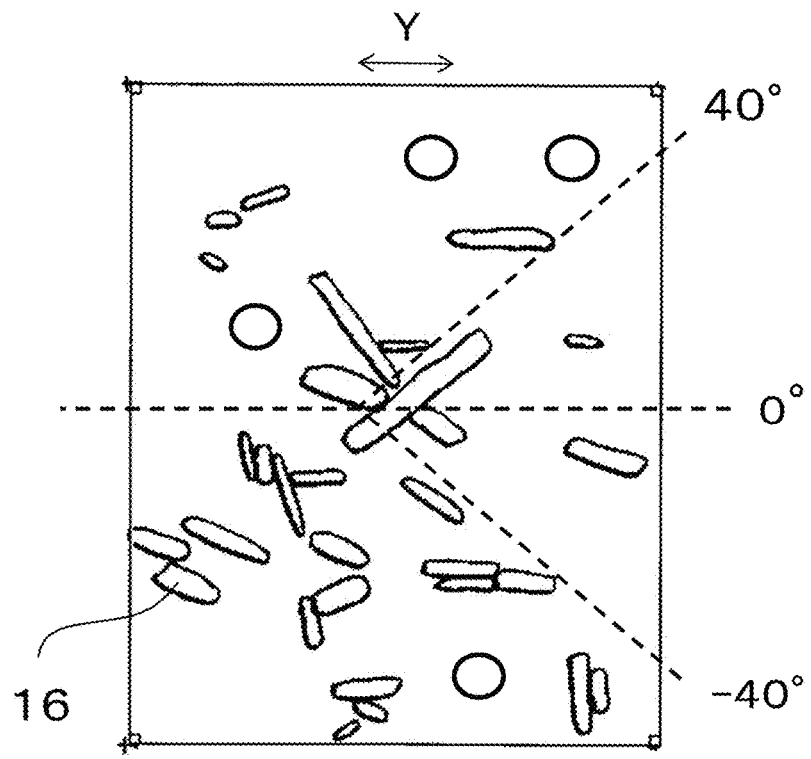
FIG. 9 is a diagram schematically illustrating a cross-section of a bonding material according to a third embodiment taken from an A-A line.

FIG. 9 is a diagram schematically illustrating a cross-section of the bonding material according to the third embodiment, taken from the A-A line.

In FIG. 9, the major axis direction of the fibrous bodies 16 is oriented in the lateral direction of the fuel cells 3. This "lateral direction of the fuel cells 3" corresponds to a "predetermined direction". This orientation of the fibrous bodies 16 makes it possible to suppress the formation of cracks in the bonding material 15, as described above.

Note that in the present embodiment, the major axis direction of the fibrous bodies 16 being oriented in the lateral direction of the fuel cells 3 means that in a cross-section perpendicular to the thickness direction of the bonding material 15 (the cross-section indicated by the A-A line), an angle at which an extended line of the major axis direction of the fibrous bodies 16 intersects with the lateral direction of the fuel cells 3 is in a range of −40 to 40 degrees, and the same applies hereinafter.

Additionally, the percentage of fibrous bodies 16 whose major axis directions are oriented in the lateral direction of the fuel cells 3 is preferably no less than 50% in a cross-section perpendicular to the thickness direction of the bonding material 15 (the cross-section indicated by the A-A line). This makes it possible to further suppress compressive deformation in the interconnector 12, in the lateral direction of the fuel cells 3, which in turn makes it possible to suppress the formation of cracks in the bonding material 15 between the electrically conductive members 4 and the air electrode layer 11 or in the bonding material 15 between the electrically conductive member 4 and the interconnector 12.

To find the aforementioned percentage of the fibrous bodies 16 whose major axis directions are oriented in the lateral direction of the fuel cells 3, first, 10 fibrous bodies whose aspect ratios (major axis/minor axis) are no higher than 1.5 are selected at random in the cross-section indicated by the C-C line, and an average length of those major axes is then found. Meanwhile, the length of each major axis is found in the cross-section indicated by the A-A line, such as that indicated in FIG. 9. In the case where the length of the major axis is shorter than the average length of the major axis found in the cross-section indicated by the C-C line, the major axis direction of that fibrous body 16 is determined not to be oriented in the lateral direction of the fuel cells 3. On the other hand, when the length of the major axis calculated on the basis of FIG. 9 is longer than the average length of the major axis found in the cross-section indicated by the C-C line, an angle at which an extended line of that major axis intersects with the lateral direction of the fuel cells 3 is calculated, and when that angle is from −40 to 40 degrees, the major axis directions of the fibrous bodies 16 according to the present embodiment are determined to be oriented in the lateral direction of the fuel cells 3. The percentage of the fibrous bodies 16 whose major axis directions are oriented in the lateral direction of the fuel cells 3 can then be found by dividing the number of the fibrous bodies 16 in the cross-section illustrated in FIG. 9 counted as having major axis directions oriented in the lateral direction of the fuel cells 3 by the number of fibrous bodies 16 in FIG. 9.

In this measurement, the aforementioned percentage may be found by, for example, setting a random 50 μm by 50 μm square region in the cross-section perpendicular to the thickness direction of the bonding material 15 (the cross-section indicated by the A-A line).

Figure 10:
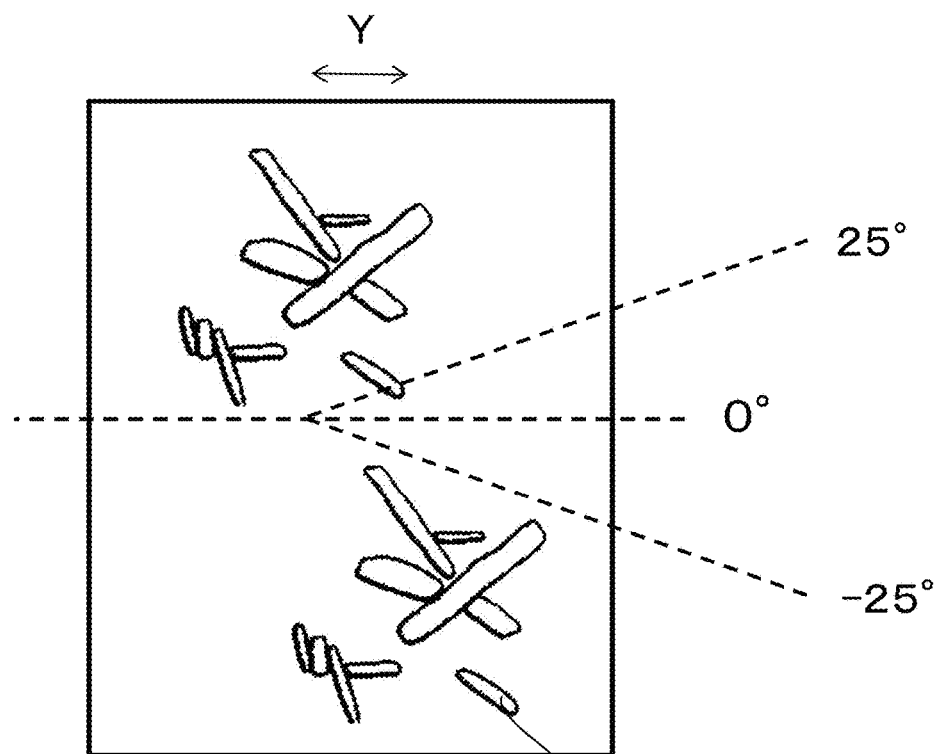
FIG. 10 is a diagram schematically illustrating a cross-section of the bonding material according to the third embodiment taken from a B-B line.

FIG. 10 is a diagram schematically illustrating a cross-section of the bonding material according to the third embodiment, taken from the B-B line.

The cell stack device 1 is in a high-temperature environment during use. As such, a difference in thermal expansion between the air electrode layer 11 and the electrically conductive member 4 at the bonding surface therebetween produces shearing stress in a direction parallel to the bonding surface. Here, if the fibrous bodies in the bonding material 15 between these members is excessively oriented in a specific direction, the shearing stress will become excessively strong in the specific direction, making it easy for cracks to form in the bonding material 15 between the electrically conductive member 4 and the air electrode layer 11. Similarly, it becomes easy for cracks to form in the bonding material 15 between the interconnector 12 and the electrically conductive member 4.

As such, the percentage of fibrous bodies 16 whose major axis directions are oriented in the lateral direction of the fuel cells 3 is preferably no greater than 30% in a cross-section of the bonding material 15 perpendicular to the longitudinal direction of the fuel cells 3 (the cross-section indicated by the B-B line), as in the example illustrated in FIG. 10. Here, when the length of the major axis calculated on the basis of FIG. 10 is longer than the average length of the major axis found in the cross-section indicated by the C-C line, an angle at which an extended line of that major axis intersects with the longitudinal direction of the fuel cells 3 is calculated, and when that angle is from −25 to 25 degrees, the major axis directions of the fibrous bodies 16 according to the present embodiment are determined to be oriented in the lateral direction of the fuel cells 3. Through this, the fibrous bodies are arranged with the major axes thereof extending randomly, rather than the fibrous bodies being oriented in a specific direction. This random arrangement makes it possible to distribute shearing stress produced by the difference in thermal expansions in a plurality of directions at the bonding surface between the air electrode layer 11 and the electrically conductive member 4 and at the bonding surface between the interconnector 12 and the electrically conductive member 4. This random arrangement makes it possible to reduce the shearing stress. Accordingly, the formation of cracks in the bonding material 15 between the electrically conductive member 4 and the air electrode layer 11 or in the bonding material 15 between the electrically conductive member 4 and the interconnector 12 can be suppressed.

Incidentally, the above-described bonding material 15 is produced by using a barrel mill, a tumbling mill, a vibrating mill, a bead mill, a sand mill, an agitator mill, or the like to wet mix and grind a powder of the electrically conductive particles and the fibrous bodies with an organic binder such as paraffin wax, polyvinyl alcohol (PVA), or polyethylene glycol (PEG) to produce a slurry.

The fuel cells 3 or the electrically conductive members 4 are laid flat and a dispenser in which a plurality of ejection holes are formed is used to apply the slurry to the surfaces thereof. At this time, the slurry is ejected while moving the dispenser in the lateral direction of the fuel cells 3. In this process, the major axis directions of the fibrous bodies 16 are oriented in the lateral direction of the fuel cells 3.

Meanwhile, the orientation percentage is determined by adjusting a movement speed of the dispenser, an angle of the dispenser, and a diameter of the ejection holes of the dispenser as appropriate.

In addition to this method, the bonding material according to the present embodiment can be obtained by producing a sheet in which the fibrous bodies 16 are oriented in a desired direction, laminating the sheet, and then subjecting the sheet to a thermal treatment.

Figure 11:
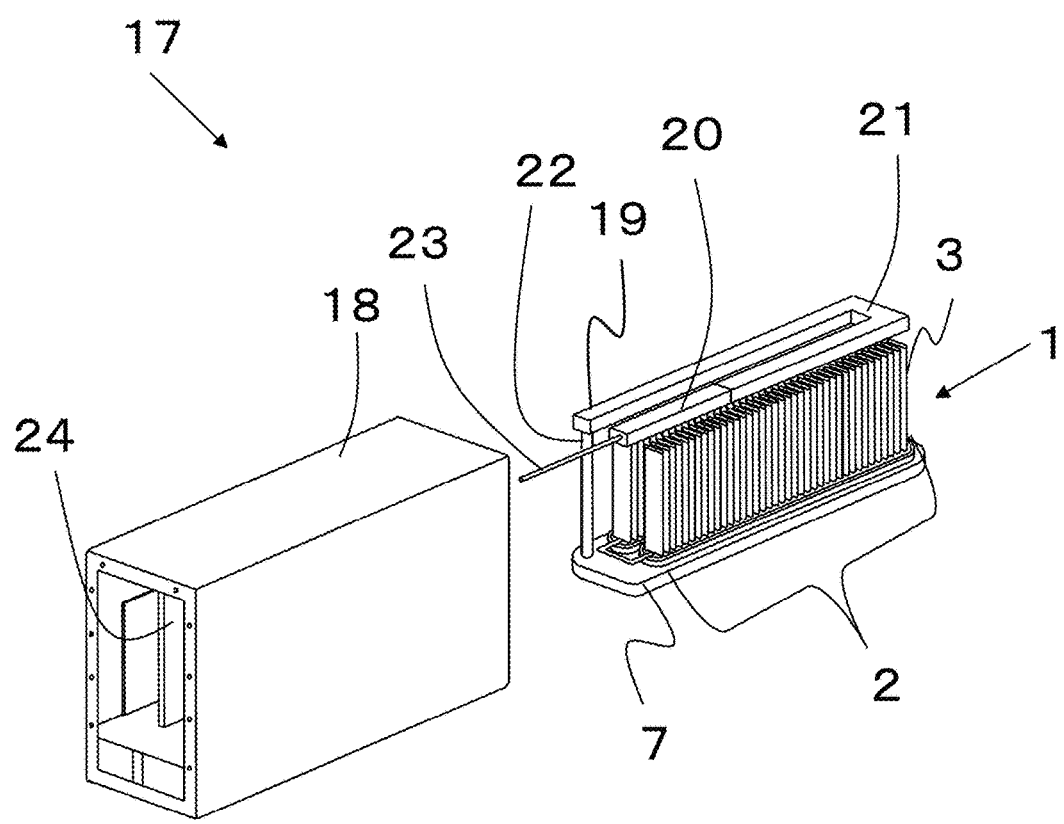
FIG. 11 is a perspective view illustrating an example of a module according to an embodiment.

FIG. 11 is an exterior perspective view illustrating an example of a fuel cell module (also referred to as a "module" hereinafter) configured including the cell stack device 1 according to the present embodiment.

In a module 17 illustrated in FIG. 11, the cell stack device 1 according to the present embodiment is housed within a housing container 18. A reformer 19 configured to generate fuel gas to be supplied to the fuel cells 3 is arranged above the cell stack device 1. Note that FIG. 11 illustrates an example in which the cell stack device 1 illustrated in FIGS. 1A and 1B includes two cell stacks 2. However, the number of cell stacks may be changed as appropriate; for example, the cell stack device 1 may include only one cell stack 2. Moreover, the cell stack device 1 can also include the reformer 19.

Moreover, the reformer 19 illustrated in FIG. 11 reforms a raw fuel such as natural gas or kerosene supplied via a raw fuel supply pipe 23 to produce the fuel gas. The reformer 19 preferably has a structure that enables steam reforming, which has an efficient reformation reaction. The reformer 19 includes a vaporizing unit 20 configured to vaporize water and a reforming unit 21 including a reforming catalyst (not illustrated) for reforming the raw fuel into fuel gas. Then, the fuel gas produced in the reformer 19 is supplied to the manifold 7 via a fuel gas channeling pipe 22 (corresponding to the fuel gas supply pipe 8 illustrated in FIG. 1A). The fuel gas is then supplied via the manifold 7 to the fuel gas flow passages disposed inside the fuel cells 3.

Moreover, FIG. 11 illustrates the cell stack device 1 housed in the housing container 18, with the cell stack device 1 extracted rearward and a portion of the housing container 18 (front and back surfaces) removed. Here, in the module 17 illustrated in FIG. 11, the cell stack device 1 can be slid and housed in the housing container 18.

Note that an oxygen-containing gas introduction member is disposed in the interior of the housing container 18, between the cell stacks 2 arranged side by side on the manifold 7, and the oxygen-containing gas flows along the sides of the fuel cells 3, from a lower end portion toward an upper end portion.

Additionally, in the module 17 configured as described above, the fuel gas and the oxygen-containing gas exhausted from the fuel gas flow passages of the fuel cells 3 and not used in power generation are combusted between an upper end of the fuel cells 3 and the reformers 19, making it possible to increase and maintain the temperature of the fuel cells 3. In addition, this makes it possible to heat the reformers 19 disposed above each of the fuel cells 3 (cell stacks 2), and efficiently perform a reformation reaction in the reformers 19. Note that during normal power generation, the module 17 has an inner temperature of approximately 500 to 1,000° C. due to the abovementioned combustion process and the power generation in the fuel cells 3.

Figure 12:
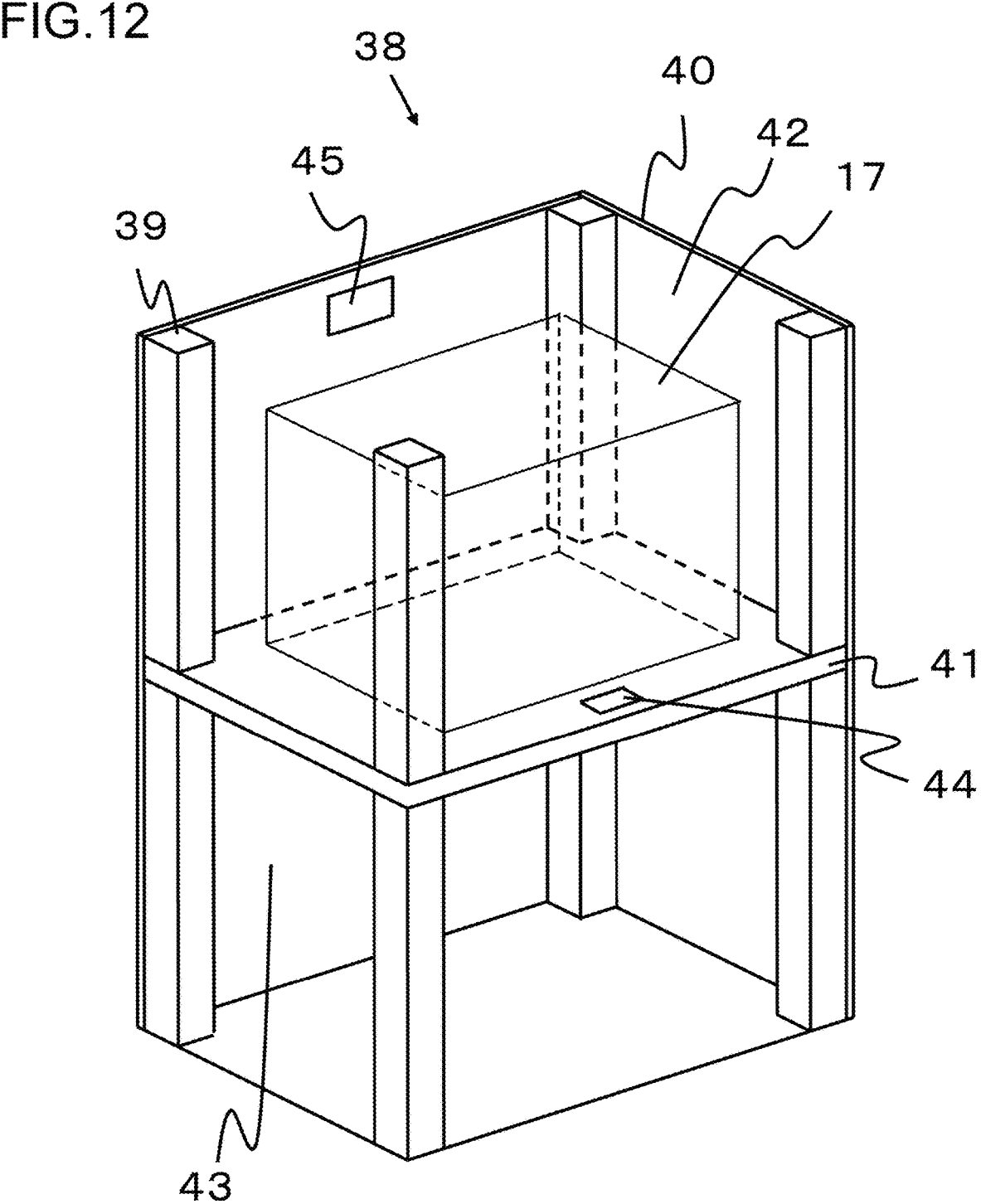
FIG. 12 is an exploded perspective view schematically illustrating an example of a module-containing device according to an embodiment.

FIG. 12 is an exploded perspective view illustrating an example of a fuel cell device according to the present embodiment in which the module 17 illustrated in FIG. 11 and an auxiliary device (not illustrated) configured to operate the module 17 are housed in an external case. Note that some of the components of the configuration are not illustrated in FIG. 12.

In a fuel cell device 38 illustrated in FIG. 12, an external case formed of supports 39 and exterior plates 40 is divided into an upper and a lower region using a dividing plate 41. The upper side thereof forms a module housing chamber 42 for housing the module 17. The lower side thereof forms an auxiliary device storage chamber 43 for housing the auxiliary device configured to operate the module 17. Note that the auxiliary device housed in the auxiliary device storage chamber 43 is not illustrated in FIG. 12.

Furthermore, an airflow hole 44 for allowing air in the auxiliary device housing chamber 43 to flow into the module housing chamber 42 is formed in the divider 41, and an exhaust hole 45 for exhausting air out of the module housing chamber 42 is formed in one of the outer plates 40 of the module housing chamber 42.

In this fuel cell device 38, the module 17 having improved performance as described above is housed in the module housing chamber 42, and the auxiliary device configured to operate the module 17 is housed in the auxiliary device storage chamber 43. This configuration makes it possible to provide a fuel cell device 38 with improved performance.

The present invention has been described in detail above. However, the present invention is not limited to the embodiments described above, and various modifications or improvements can be made without departing from the essential spirit of the present invention.

For example, the fuel cell may be a fuel cell in which the air electrode layer 11, the solid electrolyte layer 10, and the fuel electrode layer 9 are arranged on the support body 13. Furthermore, although the above embodiments describe the fuel electrode layer 9, the solid electrolyte layer 10, and the air electrode layer 11 as being laminated on the support body 13, the fuel electrode layer 9 itself may be set as a support body rather than using the support body 13, and the solid electrolyte layer 10 and the air electrode layer 11 may be disposed on the fuel electrode layer 9, for example.

Furthermore, although the above embodiments describe the fuel cell 3, the cell stack device 1, the module 17, and the fuel cell device 38, the present invention can also be applied in an electrolytic cell (SOEC) that generates hydrogen and oxygen ($O_2$) by electrolyzing water vapor (water) by applying water vapor and voltage in a cell and to an electrolytic cell stack device, an electrolytic module, and an electrolytic device provided with this electrolytic cell.

Additionally, although the above embodiments describe a hollow plate solid oxide fuel cell, for example, a so-called banded fuel cell may be used. Furthermore, various intermediate layers may be formed between each of the members in accordance with the functions.

Working Example 1

88.5 mass % of $La_{0.6}Sr_{0.4}Co_{0.2}Fe_{0.8}O_3$ powder having an average particle diameter of 5 μm was mixed with 11.5 mass % of a powder of fibrous bodies made from aluminum oxide, having an average diameter of 3 μm and an average aspect ratio of 20, and these were then mixed with an organic binder and a solvent to produce a slurry.

This slurry was then poured into a frame prepared in advance, dried, and then fired for two hours at 1,000° C. to produce a rectangular parallelepiped-shaped test piece.

The test piece can be produced with the major axis direction of the fibrous bodies oriented in the direction of the long side of the parallelepiped frame by moving the dispenser in the long side direction relative to the parallelepiped frame when pouring the slurry into the frame. Incidentally, by laminating this test piece so that the long side direction is perpendicular to the fuel cell, the major axis direction of the fibrous bodies is a direction perpendicular to the fuel cell. On the other hand, by laminating this test piece to the fuel cell 3 so that the long side direction follows the length direction of the fuel cell, the major axis direction of the fibrous bodies becomes a direction parallel to the fuel cell. Note that the orientation states of the fibrous bodies was confirmed by cutting parts of the respective test pieces and viewing a scanning electron microscope (SEM) photograph of the resulting cross-sections.

Figure 13:
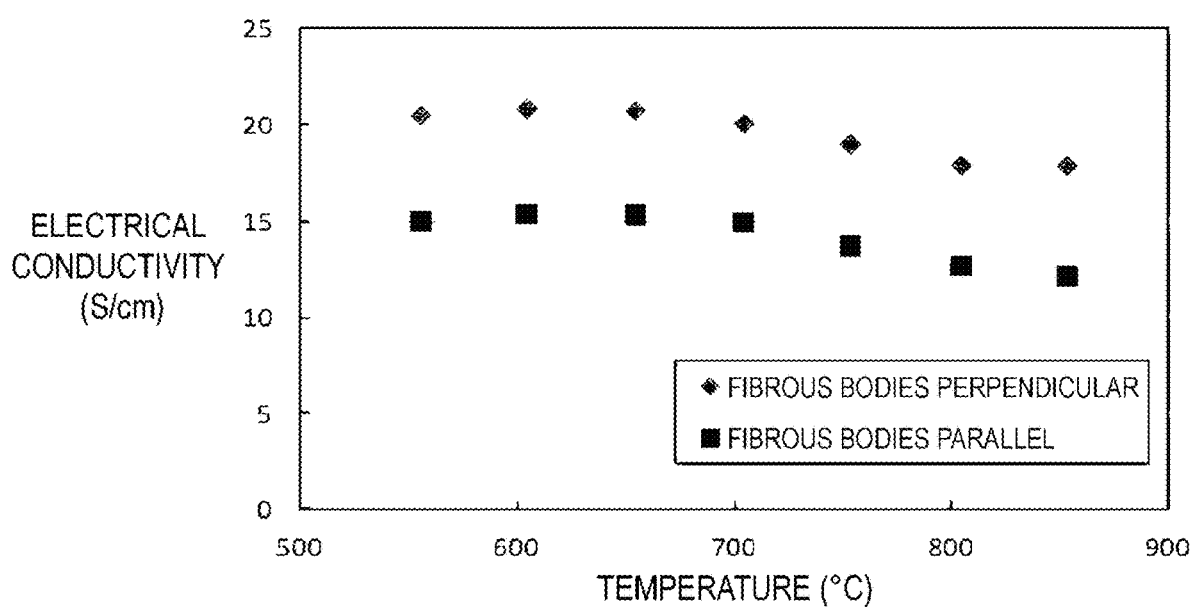
FIG. 13 is a graph illustrating a result of measuring the electrical conductivity of a test piece on the basis of four-terminal DC sensing.

Next, the electrical conductivity of each test piece was measured at approximately 800° C. on the basis of four-terminal DC sensing. The results are illustrated in FIG. 13. Note that the electrical conductivity measurement in the case where the major axis direction of the fibrous bodies is a direction perpendicular to the fuel cell is carried out using four-terminal DC sensing between one end portion and another end portion of the rectangular parallelepiped-shaped test piece in the long side direction thereof. Meanwhile, the electrical conductivity measurement in the case where the major axis direction of the fibrous bodies is a direction parallel to the fuel cell is carried out using four-terminal DC sensing between one end portion and another end portion of the rectangular parallelepiped-shaped test piece in a short side direction thereof.

As illustrated in FIG. 13, a test piece in which the major axis direction of the fibrous bodies is oriented in a horizontal direction (corresponding to a direction perpendicular to the fuel cell) was confirmed as having a higher electrical conductivity than that of a test piece where the major axis direction of the fibrous bodies is a vertical direction (corresponding to a direction parallel to the fuel cell).

As such, it was successfully confirmed that ensuring that the major axis directions of at least some of the fibrous bodies are oriented in a direction perpendicular to the fuel cell at parts of the bonds between the fuel cell and the electrically conductive member where the electrically conductive member and the fuel cell oppose each other improves the electrical conductivity.

Working Example 2

A plurality of test pieces were produced using the same material as described in Working Example 1 with percentages of orientation in the long side direction of the test piece (orientation percentages) at the values shown in Table 1, and these test pieces were taken as samples No. 1 to 6. The orientation percentage of each sample was calculated using the number ratio described above.

The electrical conductivity of each sample at approximately 800° C. was then measured. The results are shown in Table 1.

TABLE 1

| Samples No. | Orientation Percentage (%) | Electrical Conductivity (S/cm) |
| --- | --- | --- |
| 1 | 93 | 19.24 |
| 2 | 90 | 18.47 |
| 3 | 76 | 17.96 |
| 4 | 50 | 17.20 |
| 5 | 47 | 15.54 |
| 6 | 42 | 12.74 |

In Table 1, samples No. 1 and 2, in which 90% or greater of the fibrous bodies are oriented in the long side direction of the test piece, had an electrical conductivity greater than 18 S/cm. It is thus confirmed that the electrical conductivity can be improved by setting the percentage of orientation in a direction perpendicular to the fuel cell to no less than 90%.

Working Example 3

A plurality of test pieces were produced using the same material as described in Working Example 1 with ratios of major axes to minor axes of the fibrous bodies at the values shown in Table 2, and these test pieces were taken as samples No. 7 to 10. The percentages of fibrous bodies oriented in the long side direction of the test piece were 93% for sample No. 7, 90% for sample No. 8, 76% for sample No. 9, and 50% for sample No. 10. The ratio of the major axis to the minor axis was calculated by capturing an SEM photograph corresponding to a cross-section perpendicular to the long side direction of the test piece, such as that indicated in FIG. 4B. The ratio of the major axis to the minor axis for each sample shown in Table 2 is an average value for the fibrous bodies 16 present in a cross-sectional photograph of a 500 μm square region photographed at random.

The electrical conductivity of each sample at approximately 800° C. was then measured. The results are shown in Table 2.

TABLE 2

| Samples No. | Ratio of Major Axis to Minor Axis | Electrical Conductivity (S/cm) |
| --- | --- | --- |
| 7 | 1.2 | 19.13 |
| 8 | 1.7 | 18.47 |
| 9 | 2 | 17.97 |
| 10 | 2.3 | 17.40 |

In Table 2, samples No. 7 and 8, in which the ratio of the major axis to the minor axis of the fibrous bodies is no higher than 1.7, have an electrical conductivity greater than 18 S/cm. It is thus confirmed that the electrical conductivity can be improved in the case where the ratio of the major axis to the minor axis is no higher than 1.7.

Working Example 4

Next, test pieces serving as samples No. 11 to 14 were prepared through the same manufacturing method as in Working Example 1. The material of the fibrous bodies in each sample were as shown in Table 3. Note that sample No. 11 was a test piece not containing fibrous bodies.

Each test piece was fired in the same manner as in Working Example 1 during manufacture, and was visually observed to determine whether or not fine cracks had formed therein. The results are shown in Table 3. Note that this testing was done on the bonding material alone, and whether or not cracks had formed was visually confirmed based on the bonding material alone.

TABLE 3

| Samples No. | Fibrous Bodies | Presence/Absence of Fine Cracks |
| --- | --- | --- |
| 11 | — | Present |
| 12 | $Al_2O_3$ | Absent |
| 13 | $SiO_2$ | Absent |
| 14 | $TiO_2$ | Absent |

Based on the results in Table 3, fine cracks had formed after firing in the test piece serving as sample No. 11, which did not contain the fibrous bodies. On the other hand, cracks did not form in the test pieces serving as samples No. 12 to 14, in which the material of the fibrous bodies was an oxide of Al, Si, or Ti.

Accordingly, it is confirmed that in the case where the material of the fibrous bodies is an oxide of Al, Si, or Ti, firing shrinkage between the electrically conductive particles can be suppressed and the formation of cracks can be suppressed.

Working Example 5

88.5 mass % of $La_{0.6}Sr_{0.4}Co_{0.2}Fe_{0.8}O_3$ powder having an average particle diameter of 5 μm was mixed with 11.5 mass % of a powder of fibrous bodies made from aluminum oxide, having an average diameter of 3 μm and an average aspect ratio of 5, and these were then mixed with an organic binder and a solvent to produce a slurry.

Then, with the fuel cells according to the example illustrated in FIGS. 1A and 1B laid flat, a dispenser in which a plurality of ejection openings are formed was used to apply the slurry to the surfaces thereof. Note that the dispenser was moved in the longitudinal direction of the fuel cells.

The electrically conductive member was placed on the surface of the slurry, which was then dried under a normal atmosphere and heated to 1,000° C. so as to bond the electrically conductive member to the fuel cells.

Samples No. 15 to 19 of a joint body between the electrically conductive member and the fuel cells were produced in this manner.

Next, the fuel cells 3 configured with such joint bodies were subjected to a test in which the fuel gas was supplied from an entry to an exit of the gas-flow passages and the supply of the fuel gas was then stopped after a set amount of time (a start-stop test).

Whether or not cracks were present in the bonding material between the electrically conductive member and the fuel cells was then observed. This observation was carried out using a scanning electron microscope (SEM). The results are shown in Table 4. As shown in Table 4, whether or not cracks were present was observed after respective predetermined numbers of start-stop tests (50, 100, 150, and 200 tests). Cracks being present is indicated by a ○, and cracks being absent is indicated by a X. Note that the SEM photograph observation used the C-C cross-section indicated in FIG. 6.

In the testing of each sample no., the start-stop test was first carried out 50 times for the first joint body, and the SEM photograph was observed. The testing was stopped if cracks had formed at that point, but if no cracks had formed, the start-stop test was carried out 100 times on the second joint body, and the same observation was made again. In this manner, the same testing and observation was carried out 150 and 200 times in that order.

TABLE 4

| Samples No. | Orientation Percentage in A-A Cross-section (%) | Orientation Percentage in B-B Cross-section (%) | Presence/Absence of Cracks after Start-stop Test | | | |
|---|---|---|---|---|---|---|
| | | | 50 Tests | 100 Tests | 150 Tests | 200 Tests |
| 15 | 38 | 10 | X | ○ | — | — |
| 16 | 50 | 15 | X | X | X | ○ |
| 17 | 63 | 22 | X | X | X | ○ |
| 18 | 81 | 27 | X | X | X | ○ |
| 19 | 0 | 36 | ○ | — | — | — |

In the results shown in Table 4, cracks did not form in the bonding material 15 serving as samples No. 15 to 18 even when at least 100 start-stop tests were carried out. However, cracks formed in the bonding material serving as sample No. 19 when 50 start-stop tests were carried out.

From the results shown in Table 4, it is confirmed that the formation of cracks in the bonding material can be suppressed in the case where the major axis direction of the fibrous bodies in the bonding material is oriented in the longitudinal direction of the fuel cells 3, as in samples No. 15 to 18, as compared to the case where the stated major axis direction is not oriented in the longitudinal direction of the fuel cells, as in sample No. 19.

Additionally, the examples indicated by samples No. 16 to 18 had a much greater number of start-stop tests before cracks were observed than the example indicated by sample No. 15. Accordingly, it is confirmed that the formation of cracks in the bonding material can be further suppressed in the case where the percentage of the fibrous bodies whose major axis directions are oriented in the longitudinal direction of the fuel cells is no less than 50% in a cross-section perpendicular to the thickness direction of the bonding material (the A-A cross-section).

Working Example 6

Next, samples No. 20 to 22 of the joint body between the electrically conductive member and the fuel cells were produced using the same manufacturing method as that used for samples No. 15 to 18.

The same start-stop test as described above was then carried out for the fuel cells configured with these joint bodies. Whether or not cracks were present in the bonding material between the electrically conductive member and the fuel cells was then observed in the same manner as described above. The results are shown in Table 5.

TABLE 5

| Samples No. | Orientation Percentage in A-A Cross-section (%) | Orientation Percentage in B-B Cross-section (%) | Orientation Percentage in C-C Cross-section (%) | Presence/Absence of Cracks after Start-stop Test | | | | | |
|---|---|---|---|---|---|---|---|---|---|
| | | | | 50 Tests | 100 Tests | 150 Tests | 200 Tests | 250 Tests | 300 Tests |
| 20 | 74 | 24 | 36 | X | X | X | ○ | — | — |
| 21 | 75 | 27 | 30 | X | X | X | X | X | ○ |
| 22 | 73 | 26 | 19 | X | X | X | X | X | ○ |

In the results shown in Table 5, the examples indicated by samples No. 21 and 22 had a much greater number of start-stop tests before cracks were observed than the example indicated by sample No. 20. Accordingly, it is confirmed that the formation of cracks in the bonding material can be further suppressed in the case where the percentage of the fibrous bodies whose major axis directions are oriented in the longitudinal direction of the fuel cells is no greater than 30% in a cross-section of the bonding material perpendicular to the lateral direction of the fuel cells (the cross-section indicated by the C-C line).

Working Example 7

88.5 mass % of $La_{0.6}Sr_{0.4}Co_{0.2}Fe_{0.8}O_3$ powder having an average particle diameter of 5 μm was mixed with 11.5 mass % of a powder of fibrous bodies made from aluminum oxide, having an average diameter of 3 μm and an average aspect ratio of 5, and these were then mixed with an organic binder and a solvent to produce a slurry.

Then, with the fuel cells according to the example illustrated in FIGS. 1A and 1B laid flat, a dispenser in which a plurality of ejection openings are formed was used to apply the slurry to the surfaces thereof. Note that the dispenser was moved in the lateral direction of the fuel cells.

The electrically conductive member was placed on the surface of the slurry, which was then dried under a normal atmosphere and heated to 1,000° C. so as to bond the electrically conductive member to the fuel cells.

Samples No. 23 to 27 of the joint body between the electrically conductive member and the fuel cells were produced in this manner.

The same start-stop tests as in Working Example 5 was then carried out for the fuel cells configured with these joint bodies. Whether or not cracks were present in the bonding material 15 between the electrically conductive member and the fuel cells was then observed in the same manner as described above. The results are shown in Table 6.

TABLE 6

| Samples No. | Orientation Percentage in A-A Cross-section (%) | Orientation Percentage in C-C Cross-section (%) | Presence/Absence of Cracks after Start-stop Test | | | |
|---|---|---|---|---|---|---|
| | | | 50 Tests | 100 Tests | 150 Tests | 200 Tests |
| 23 | 38 | 10 | X | ○ | — | — |
| 24 | 50 | 15 | X | X | X | ○ |
| 25 | 63 | 22 | X | X | X | ○ |
| 26 | 81 | 27 | X | X | X | ○ |
| 27 | 0 | 36 | ○ | — | — | — |

In the results shown in Table 6, cracks did not form in the bonding material 15 serving as samples No. 23 to 26 even when at least 100 start-stop tests were carried out. However, cracks formed in the bonding material serving as sample No. 27 when 50 start-stop tests were carried out.

From the results shown in Table 6, it is confirmed that the formation of cracks in the bonding material can be suppressed in the case where the major axis direction of the fibrous bodies in the bonding material is oriented in the lateral direction of the fuel cells, as in samples No. 23 to 26, as compared to the case where the stated major axis direction is not oriented in the lateral direction of the fuel cells, as in sample No. 27.

Additionally, the examples indicated by samples No. 24 to 26 had a much greater number of start-stop tests before cracks were observed than the example indicated by sample No. 23. Accordingly, it is confirmed that the formation of cracks in the bonding material can be further suppressed in the case where the percentage of the fibrous bodies whose major axis directions are oriented in the lateral direction of the fuel cells is no less than 50% in a cross-section perpendicular to the thickness direction of the bonding material (the A-A cross-section).

Working Example 8

Next, samples No. 28 to 30 of the joint body between the electrically conductive member and the fuel cells were produced using the same manufacturing method as that used for samples No. 23 to 26.

The same start-stop test as described above was then carried out for the fuel cells 3 configured with these joint bodies. Whether or not cracks were present in the bonding material between the electrically conductive member 4 and the fuel cells was then observed in the same manner as described above. The results are shown in Table 7.

TABLE 7

| Samples No. | Orientation Percentage in A-A Cross-section (%) | Orientation Percentage in B-B Cross-section (%) | Orientation Percentage C-C Cross-section (%) | Presence/Absence of Cracks after Start-stop Test | | | | | |
|---|---|---|---|---|---|---|---|---|---|
| | | | | 50 Tests | 100 Tests | 150 Tests | 200 Tests | 250 Tests | 300 Tests |
| 28 | 74 | 36 | 24 | X | X | X | ○ | — | — |
| 29 | 75 | 30 | 27 | X | X | X | X | X | ○ |
| 30 | 73 | 19 | 26 | X | X | X | X | X | ○ |

In the results shown in Table 7, the examples indicated by samples No. 29 and 30 had a much greater number of start-stop tests before cracks were observed than the example indicated by sample No. 28. Accordingly, it is confirmed that the formation of cracks in the bonding material can be further suppressed in the case where the percentage of the fibrous bodies whose major axis directions are oriented in the lateral direction of the fuel cells 3 is no greater than 30% in a cross-section of the bonding material perpendicular to the longitudinal direction of the fuel cells (the cross-section indicated by the B-B line).

REFERENCE SIGNS LIST

1 Cell stack device
3 Fuel cell
4 Electrically conductive member
15 Bonding material
16 Fibrous bodies
17 Fuel cell module
38 Fuel cell device

What is claimed is:
1. A cell stack device comprising:
a plurality of cells having a columnar shape; and
an electrically conductive member interposed between adjacent cells of the plurality of cells and connected to each of the respective adjacent cells with a bonding material having electrically conductive property,
wherein
the bonding material contains electrically conductive particles and fibrous bodies having electrically insulating property, and
a major axis direction of the fibrous bodies is oriented in a predetermined direction in regions where the electrically conductive members face each of the respective adjacent cells, wherein
the major axis direction of the fibrous bodies is oriened in a longitudinal direction of the plurality of cells and
in a cross-section of the bonding material perpendicular to a lateral direction of the plurality of cells, a percentage of the fibrous bodies, whose major axis directions are oriented in the longitudinal direction of the plurality of cells, is no greater than 30%.
2. The cell stack device according to claim 1,
wherein in a cross-section perpendicular to a thickness direction of the bonding material, a percentage of the fibrous bodies, whose major axis directions are oriented in the longitudinal direction of the plurality of cells, is no less than 50%.
3. The cell stack device according to claim 1, wherein
the electrically conductive particles are composed of a perovskite oxide containing La, and
the fibrous bodies having electrically insulating properties are composed of an oxide of at least one of Al, Si, and Ti.

4. A module comprising:
the cell stack device according to claim 1; and
a housing container containing the cell stack device therein.

5. A module-containing device comprising:
the module according to claim 4;
an auxiliary device configured to operate the module; and
an external case containing the module and the auxiliary device therein.

6. The cell stack device according to claim 1,
wherein the fibrous bodies are 5 to 30 mass % of the bonding material.

7. The cell stack device according to claim 2,
wherein in the cross-section perpendicular to the thickness direction of the bonding material, an angle at which the major axis direction of the fibrous bodies intersects the longitudinal direction is in a range of −40 to 40 degrees.

8. The cell stack device according to claim 1,
wherein in the cross-section of the bonding material perpendicular to the lateral direction of the plurality of cells, an angle at which the major axis direction of the fibrous bodies intersects the longitudinal direction is in a range of −25 to 25 degrees.

9. The cell stack device according to claim 8,
wherein in a cross-section perpendicular to a thickness direction of the bonding material, a percentage of the fibrous bodies, whose major axis directions are oriented in the longitudinal direction of the plurality of cells, is no less than 50%.

10. The cell stack device according to claim 8, wherein
the electrically conductive particles are composed of a perovskite oxide containing La, and
the fibrous bodies having the electrically insulating property are composed of an oxide of at least one of Al, Si, and Ti.

11. A module comprising:
the cell stack device according to claim 8; and
a housing container containing the cell stack device therein.

12. A module-containing device comprising:
the module according to claim 11;
an auxiliary device configured to operate the module; and
an external case containing the module and the auxiliary device therein.

13. The cell stack device according to claim 8,
wherein the fibrous bodies are 5 to 30 mass % of the bonding material.

14. The cell stack device according to claim 9,
wherein in the cross-section perpendicular to the thickness direction of the bonding material, an angle at which the major axis direction of the fibrous bodies intersects the longitudinal direction is in a range of −40 to 40 degrees.

* * * * *

UNITED STATES PATENT AND TRADEMARK OFFICE
CERTIFICATE OF CORRECTION

PATENT NO. : 10,651,481 B2  
APPLICATION NO. : 15/126685  
DATED : May 12, 2020  
INVENTOR(S) : Sugihara Kazunari Page 1 of 1

It is certified that error appears in the above-identified patent and that said Letters Patent is hereby corrected as shown below:

In the Specification

Column 22, Lines 25-26, change 'interposed between adjacent cells' to -- interposed between respective adjacent cells --.

Column 22, Line 37, change 'oriened' to -- oriented --.

Signed and Sealed this  
Eleventh Day of August, 2020

Andrei Iancu  
*Director of the United States Patent and Trademark Office*